US007927508B2

(12) United States Patent
Martin

(10) Patent No.: US 7,927,508 B2
(45) Date of Patent: *Apr. 19, 2011

(54) COMPOSITION AND PROCESS FOR ENHANCED SANITATION AND OXIDATION OF AQUEOUS SYSTEMS

(75) Inventor: Roy W. Martin, Downers Grove, IL (US)

(73) Assignee: Truox, Inc., McClellan, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 12/317,010

(22) Filed: Dec. 18, 2008

(65) Prior Publication Data

US 2009/0145857 A1 Jun. 11, 2009

Related U.S. Application Data

(63) Continuation-in-part of application No. 11/598,384, filed on Nov. 13, 2006, now Pat. No. 7,794,607, which is a continuation-in-part of application No. 11/494,228, filed on Jul. 27, 2006, now abandoned, which is a continuation-in-part of application No. 11/226,100, filed on Sep. 14, 2005, now Pat. No. 7,572,390, which is a continuation-in-part of application No. 11/158,676, filed on Jun. 22, 2005, now Pat. No. 7,476,333.

(51) Int. Cl.
*C01B 11/02* (2006.01)
*C01B 11/10* (2006.01)
*C01B 7/09* (2006.01)
*C02F 1/76* (2006.01)

(52) U.S. Cl. ............. 252/187.21; 252/187.1; 252/187.2; 252/187.32; 252/187.33; 252/187.34; 252/175; 252/180; 252/181; 252/186.33; 210/754; 210/755; 210/756; 210/759; 210/763

(58) Field of Classification Search ............... 252/187.2, 252/187.21, 187.23; 210/754, 755, 756, 210/758
See application file for complete search history.

(56) References Cited

U.S. PATENT DOCUMENTS

| | | | | | |
|---|---|---|---|---|---|
| 3,754,081 | A | * | 8/1973 | De Vere Partridge | 423/520 |
| 5,208,057 | A | * | 5/1993 | Greenley et al. | 426/332 |
| 5,464,636 | A | * | 11/1995 | Hight et al. | 424/661 |
| 5,603,840 | A | * | 2/1997 | Strittmatter et al. | 210/698 |
| 5,858,246 | A | * | 1/1999 | Rafter et al. | 210/754 |
| 6,303,038 | B1 | * | 10/2001 | Sanders et al. | 210/754 |
| 7,449,119 | B2 | * | 11/2008 | Brown | 210/753 |
| 7,476,333 | B2 | * | 1/2009 | Martin | 252/186.33 |
| 7,572,384 | B2 | * | 8/2009 | Martin | 210/759 |
| 7,572,390 | B2 | * | 8/2009 | Martin | 252/186.33 |
| 7,794,607 | B2 | * | 9/2010 | Martin | 210/759 |
| 2003/0080317 | A1 | * | 5/2003 | Speronello et al. | 252/175 |
| 2006/0016765 | A1 | * | 1/2006 | DiPietro et al. | 210/754 |

(Continued)

FOREIGN PATENT DOCUMENTS

WO   WO 2007/078838 A2 *  7/2007

*Primary Examiner* — Joseph D Anthony

(57) ABSTRACT

An efficient cyclic process and related compositions for the in-situ generation of oxyhalogens from anions of chloride, bromide and chlorite in an aqueous system using in-situ generated sulfate free radicals. The cyclic process and compositions enhance the rate of inactivation of microbiological organisms especially those resistant to inactivation from free halogen based sanitizers, and oxidation of oxidation resistant organic based compounds in aqueous solution. Aquatic facilities susceptible to accumulation of organic N-chloramines and other oxidation resistant compounds, as well as oxidation resistant parasitic organisms such as *cryptosporidium* and *Giardia*, obtain dramatic improvements in the rate of oxidation and subsequent inactivation of these undesirable contaminants.

15 Claims, 9 Drawing Sheets

U.S. PATENT DOCUMENTS

| | | | |
|---|---|---|---|
| 2006/0293179 A1* | 12/2006 | Martin | 502/321 |
| 2007/0023357 A1* | 2/2007 | Brown | 210/668 |
| 2007/0116636 A1* | 5/2007 | Hemker et al. | 423/477 |
| 2007/0193958 A1* | 8/2007 | Martin | 210/749 |
| 2008/0299161 A1* | 12/2008 | Sanderson | 424/408 |
| 2009/0136597 A1* | 5/2009 | Martin | 424/661 |
| 2009/0145857 A1* | 6/2009 | Martin | 210/754 |
| 2009/0185970 A1* | 7/2009 | Sanderson | 423/477 |
| 2009/0232903 A1* | 9/2009 | Sanderson | 424/601 |
| 2010/0189630 A1* | 7/2010 | Martin | 423/477 |

* cited by examiner

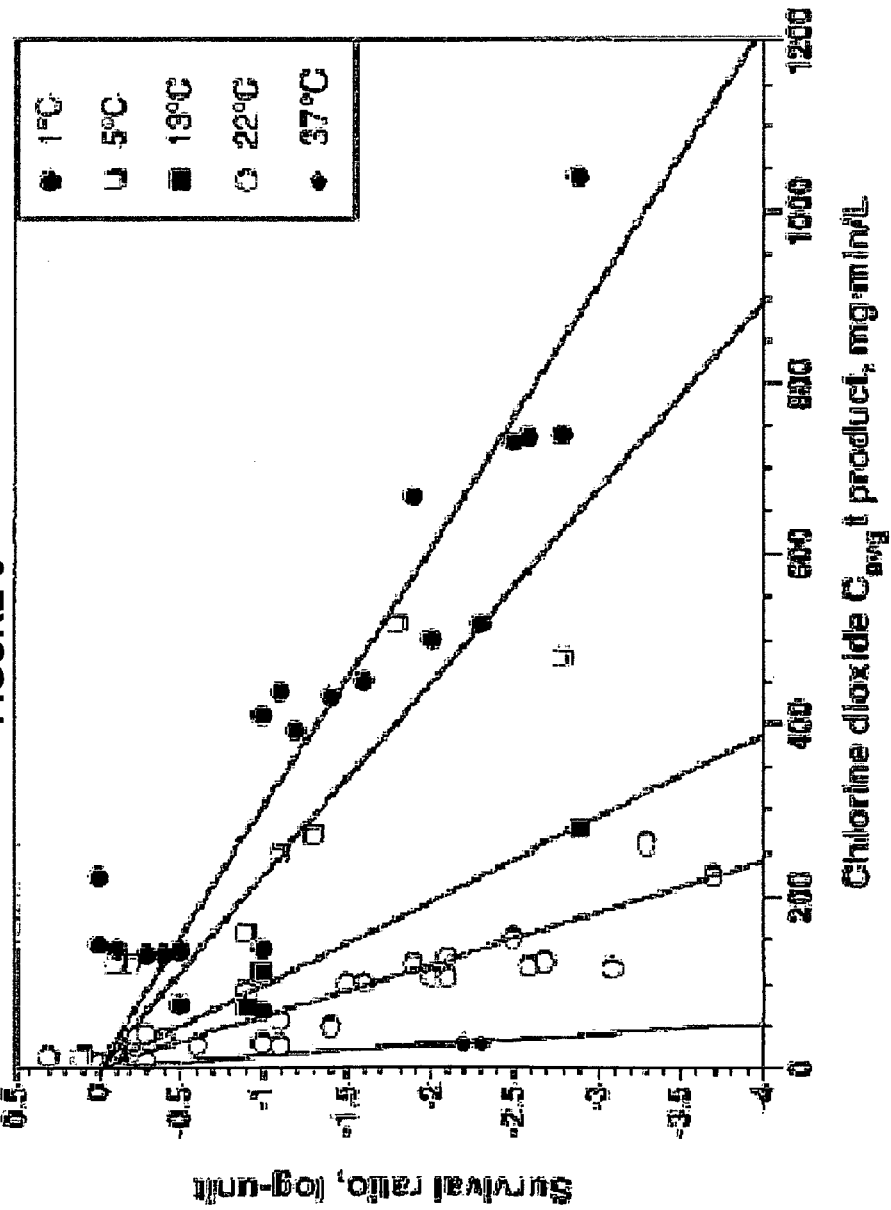
Fig 6. Survival Ratio as Function of $C_{avg} \cdot t$ Product for Chlorine Dioxide Inactivation of *C. parvum* Oocysts at Temperature from 1°C to 37°C (Lines across Origin Are Best Fit Curves for Each Temperature)

COMPOSITION AND PROCESS FOR ENHANCED SANITATION AND OXIDATION OF AQUEOUS SYSTEMS

CROSS-REFERENCE TO RELATED APPLICATIONS

This application is a continuation-in-part of application Ser. No. 11/598,384 filed Nov. 13, 2006 now U.S. Pat. No. 7,794,607, which is a continuation-in-part of application Ser. No. 11/494,228 filed Jul. 27, 2006 now abandoned, which is a continuation-in-part of application Ser. No. 11/226,100 filed Sep. 14, 2005 now U.S. Pat. No. 7,572,390, which is a continuation-in-part of application Ser. No. 11/158,676 filed Jun. 22, 2005 now U.S. Pat. No. 7,476,333. The priority applications are expressly incorporated by reference herein in their entirety.

BACKGROUND OF THE INVENTION

1. Field of Invention

This invention relates to compositions for enhanced sanitation and oxidation of aqueous solutions, such as aquatic facilities, and methods for their use.

2. Background of the Technology

Aquatic facilities such as swimming pools, spas and fountains have become increasingly popular in private homes, hotels, fitness centers, and resorts. To ensure that the aquatic facilities can be enjoyed safely, the water must be treated to reduce or eliminate chemical oxygen demands (COD) and/or total organic carbon (TOC), and various pathogens such as bacteria, viruses, parasitic organisms and algae. When the COD and/or TOC increases in the water, the oxidation reduction potential of the water decreases and oxidizers are added to maintain a healthy level of oxidation reduction potential. A common oxidizer that is used in aquatic facilities is chlorine or bromine. However, when chlorine or bromine is present in the water above a certain level in the presence of COD and/or TOC, trihalomethanes (THM) and chloramines form in the water undesirably.

Common ingredients for treating water systems include various persulfate salts and persulfate donors such as potassium monopersulfate (PMPS), which is typically available in the form of a triple salt, $(KHSO_5)_x \cdot (KHSO_4)_y \cdot (K_2SO_4)_z$ (herein referred to as "PMPS triple salt"). However, PMPS typically contains persulfate salts, such as potassium persulfate ($K_2S_2O_8$) as a by-product, are difficult to use because such persulfate salts can cause severe irritation to aquatic facility users (e.g., swimmers, bathers), in particular at concentrations above about 2 ppm. The strong oxidation potential of PMPS triple salt makes it effective for decreasing the concentration of COD. Typically, these chemicals are applied to the aquatic facility through a "shock treatment" whereby the facility is evacuated and the product is broadcast across the water surface. The facility users may not be allowed to come in contact with the treated water for a period of time after the treatment due to concerns for irritation. Typically facility users may not be allowed to come in contact with the treated water for about 15-30 minutes until the chemical has dissipated.

PMPS usually contains potassium persulfate ($K_2S_2O_8$) as a result of being prepared using oleum. Persulfates such as $K_2S_2O_8$ have a long half-life in aquatic facilities and are undesirable due to their irritant nature. As a result of the concerns for irritation resulting from accumulation of persulfate, PMPS can only be used in aquatic facilities in limited amounts, which typically do not exceed two pounds per 10,000 gallons of water per week.

While PMPS maintains the water quality in aquatic facilities reasonably well, it is not convenient to use because of the need to evacuate the facility during use and the fact that it can only be used in limited doses regardless of how heavily the facility is used. Furthermore, compounds found in aquatic and aqueous solutions may be resistant to oxidation by free halogen donors, such as chlorine and bromine, as well as commonly used oxidizers such as potassium monopersulfate, and alkali metal persulfates.

For example, when natural waters and wastewater are chlorinated, there is a residual oxidant formed, which remains stable at the breakpoint and in the presence of hypochlorite beyond the breakpoint. This residual oxidant responds to conventional methods of analysis in the same way monochloramine does. It can be shown that some organic amino nitrogen compounds form very stable organic N-chloramines that, unlike inorganic chloramines, do not decompose in the presence of excess hypochlorite". (Drinking Water Criteria Document For Chloramines, Health and Ecological Criteria Division, Office of Science and Technology, Office of Water. Environmental Protection Agency, 1994).

To further illustrate, cyanuric acid, commonly used to stabilize chlorine donors such as trichloroisocyanuric acid, and dichloroisocyanuric acid can be placed in contact with hundreds of parts per million (PPM) of free chlorine as well as potassium monopersulfate, with no measurable affect on its concentration in water. Furthermore, the presence of transition metals such as copper or silver commonly used as an algae control agent, and applied in a concentration acceptable for use an algae control agent (typically between 0.2-0.5 ppm) with excess free halogen and potassium monopersulfate has no significant affect on the concentration of the oxidation resistant organic compounds like cyanuric acid.

Furthermore, with the accumulation of organic contaminants in the aqueous solution, the Oxidation Reduction Potential (ORP) is reduced unless the concentration of free halogen donor increases. When the concentration of free chlorine rises, the potential for formation of volatile trihalomethanes and chloramines increases (FIGS. 2 and 3). With a reduction in ORP, the rate of inactivation of microbiological organisms is reduced, and the potential for transfer of the organisms through the water from mammal to mammal increases. With application of the compositions and methods of the disclosed invention, the organic contaminants are rapidly oxidized, thereby allowing the ORP to be sustained or even increased with the same concentration of free halogen in the aqueous solution. Increases in ORP are correlated with an increased rate of inactivation of microbiological organisms.

Further still, many microbiological organisms such as parasitic organisms exemplified by *cryptosporidium parvum* (commonly referred to as "crypto") are very resistant to inactivation by free halogen donors due to the oxidation resistant compound (phospholipids and proteins) making up the environmentally protective membranes, in this case the outer oocyst. Inactivation or destruction of algae blooms requires high levels of free halogen with extended contact time due to the protective cellulose membrane of the algae.

While various oxidizer systems have been developed and explored for destruction of TOC, i.e., organics in ground water etc, there is a need for compositions and methods for applying such compositions to increase the rate of inactivation of microbiological organisms, in particular, oxidation resistant organisms such as parasitic organisms including *cryptosporidium*. There is also a need for compositions and methods for applying such compositions to increase the rate of inactivation of oxidation of oxidation resistant compounds in aqueous solution, more specifically aquatic facilities and drinking water.

Furthermore, there is a need for compositions and methods that are effective to facilitate quick recovery of an aquatic facility contaminated by oxidation resistant compounds as well as from the release of microbiological organisms derived from bodily discharge (i.e. fecal release, vomit, blood etc.), in particular those that exhibit resistance to inactivation from traditional free halogen donors and standard oxidizers such as potassium monopersulfate and persulfates.

Further still, there exist a need for compositions and methods of applying said compositions to increase the rate of inactivation and oxidation in aqueous systems contaminated with organic compounds.

The present invention addresses these needs by providing compositions and methods for increasing the rate of inactivation of microbiological organisms and oxidation of oxidation resistant compounds in an aquatic facility, as detailed herein below.

SUMMARY OF THE INVENTION

In co-pending applications it was discovered that certain transition metal catalysts can be combined with persulfate based compositions and their respective solutions to produce powerful (2700 mV) sulfate free radicals resulting in enhanced sanitizing and oxidizing efficiency of the resulting solution.

The disclosed invention is based on the discovery that the in-situ generation of sulfate free radicals in the presence of relatively low concentrations of selective anions such as chloride, bromide and chlorite efficiently induces formation of their corresponding oxyhalogen surrogates such as hypochlorous acid, hypobromous acid and chlorine dioxide respectively, even at near neutral pH.

Efficient regeneration of relatively low concentrations of selective anions at near neutral pH opens the pathway for sustaining a cyclic system resulting in recycling of substantially inert anions into powerful and effective oxidants and disinfectants. The cyclic system is achieved by the process of providing an effective amount of sulfate free radical precursor to an aqueous solution while sustaining in said aqueous system an effective amount of: catalyst that decomposes the said precursor into sulfate free radicals; at least one of chloride and bromide anions; and chlorite anions. The chlorite anions are then regenerated into chlorine dioxide by oxidation from any of: sulfate free radical, sulfate free radical precursor, hypobromous acid and hypochlorous acid. This cyclic system can also be sustained while keeping the concentration of persulfate anions ($S_2O_8^=$) in the aqueous system at less than about 2.0 ppm when mammals are present such as in the case of a swimming pool to reduce the potential for irritation.

BRIEF DESCRIPTION OF THE FIGURES

FIG. 6 provides a graphic illustration of the rate of inactivation of *cryptosporidium parvum* oocyst using chlorine dioxide at varying temperatures.

DETAILED DESCRIPTION OF THE INVENTION

Figure 1:
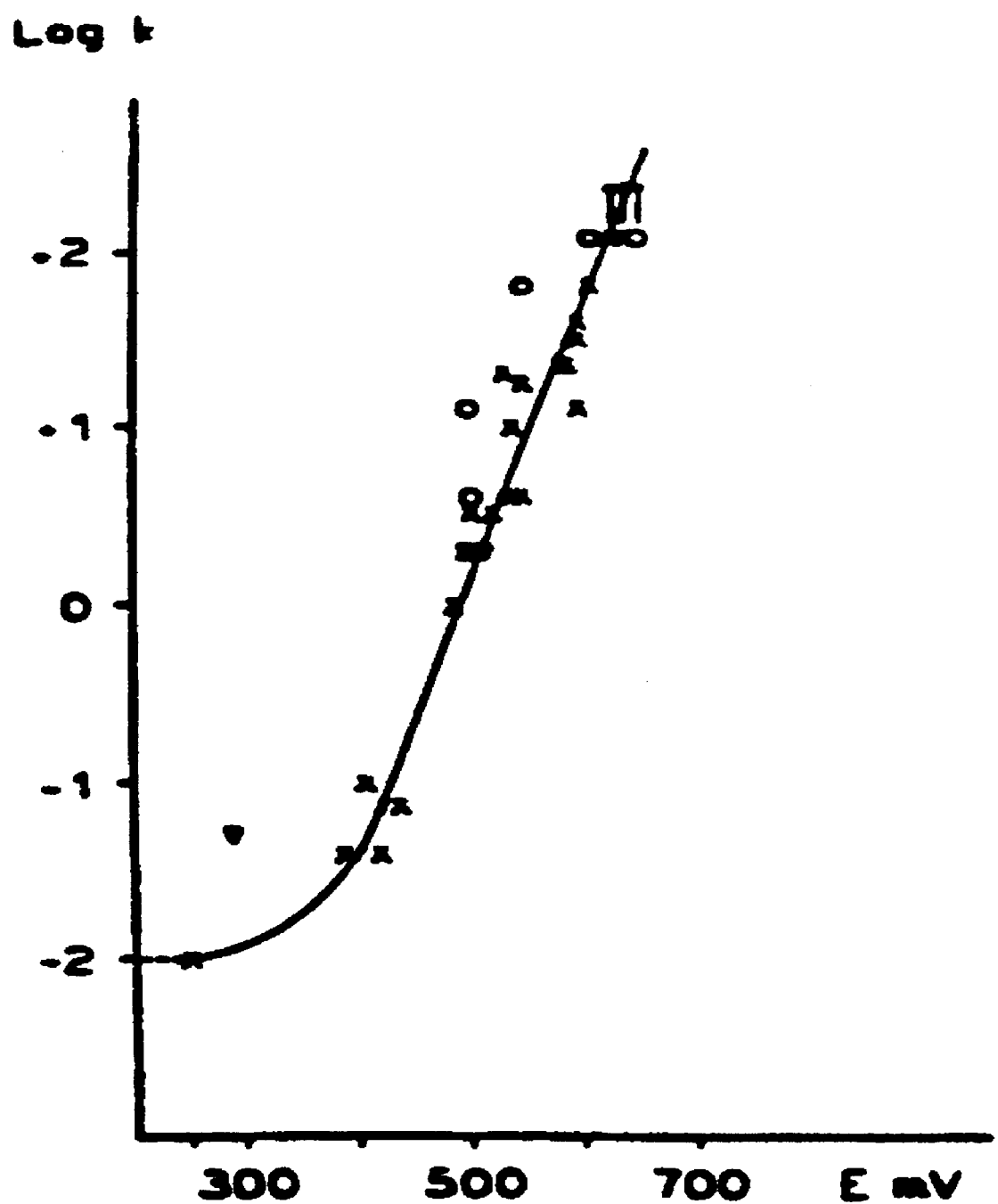
FIG. 1 is a graphic depiction of the affect of oxidation potential on Polio virus. The figure illustrates a comparison of inactivation rates using combined chlorine and free chlorine irrespective of the residual concentrations. The data illustrates that the rate of inactivation of polio virus was dependent on the Oxidation Reduction Potential (ORP) measured in millivolts (mV), and not the concentration of chlorine. (Oxidative Inactivation of Poliovirus, Virological Laboratory of the Department of Bacteriology, University of Gothenburg, and the Virological Department of the Municipal Laboratories, Gothenburg, Sweden, Ebba Lund 1963)
Figure 2:
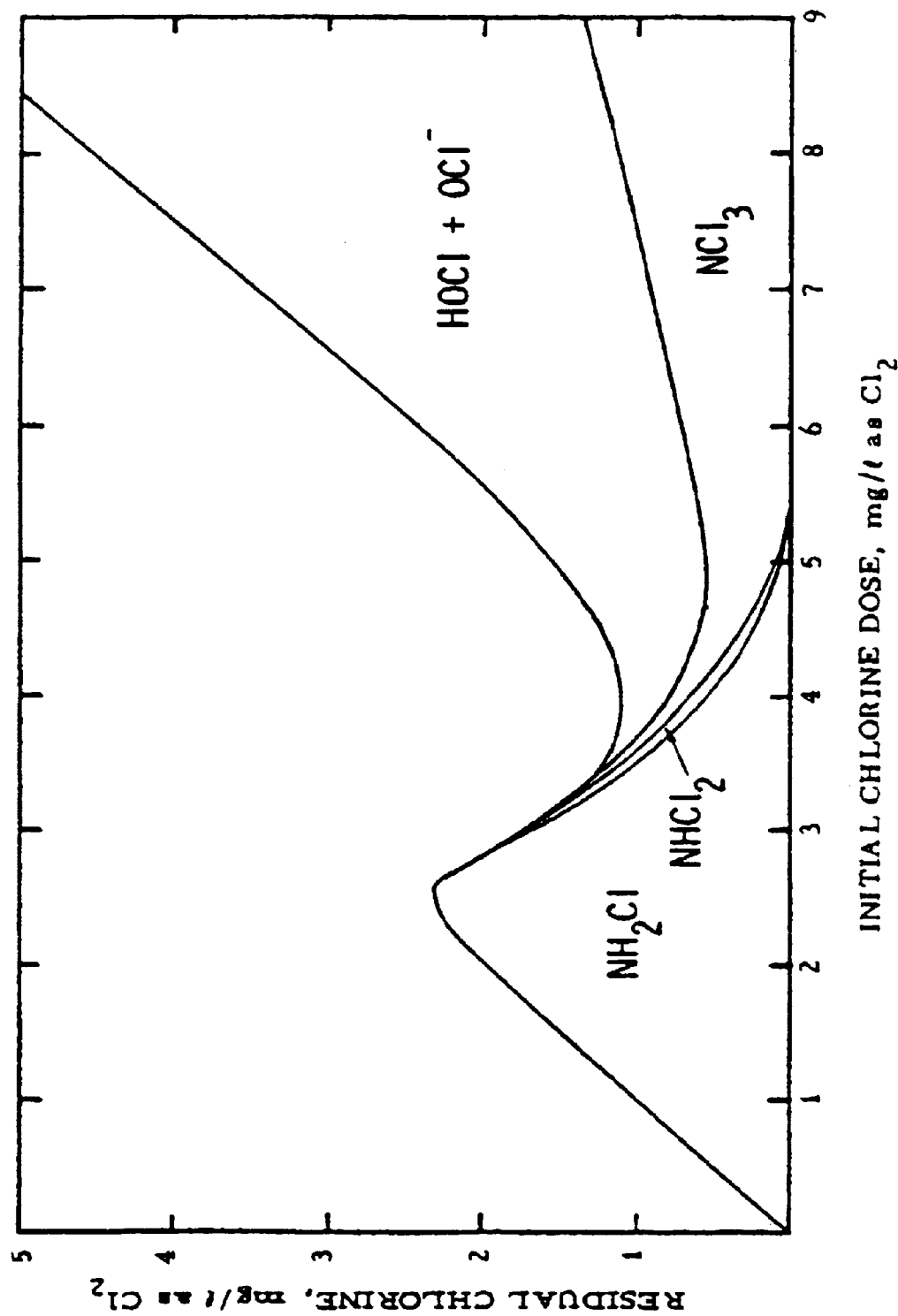
FIG. 2 is a graphic depiction of the concentration of nitrogen trichloride produced after the exposure of 0.5 ppm of nitrogen (based on ammonia); 20 minutes after an initial dose of chlorine. The graph shows that starting at 3.5 ppm of chlorine, nitrogen trichloride is produced and with increased concentrations of chlorine, a higher percentage of nitrogen trichloride is produced.
Figure 3:
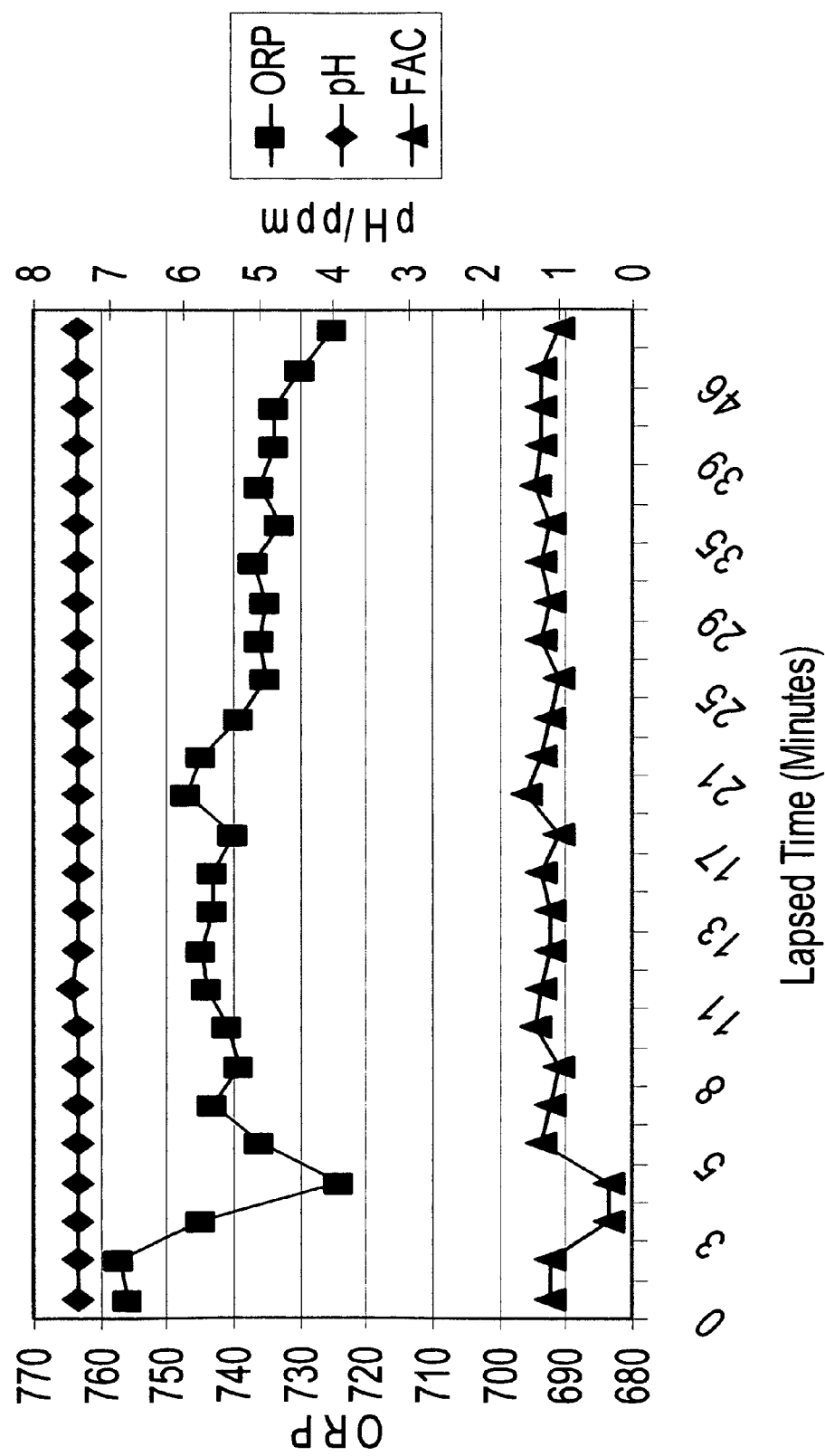
FIG. 3 is a graphic depiction of the effect of "Organic Demand" on a chlorine treated system. The graph illustrates that both free chlorine and ORP dropped after the addition of Organic Demand. While maintaining a free chlorine concentration of between 1.1-1.3 ppm, the ORP continued to decline as a result of organic byproducts produced by the reaction between chlorine and organic demand. The results show that under these conditions, chloramines and THM's increase in concentration, and the rate of inactivation of microbiological organisms is reduced resulting in reduced water quality.
Figure 4:
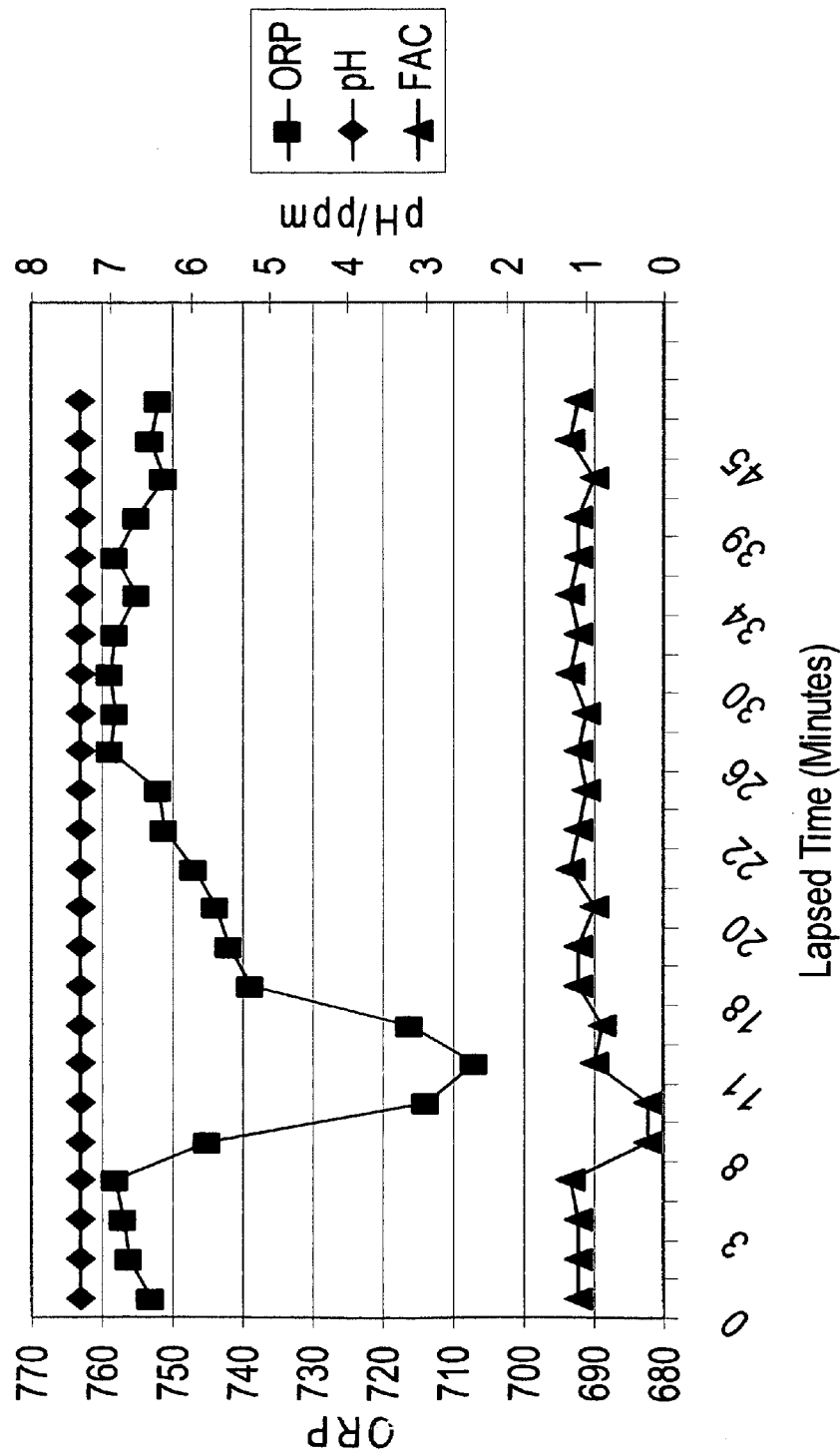
FIG. 4 is a graphic depiction of a composition of the invention on a chlorine treated system after the addition of Organic Demand. When a composition of the invention is added to the system, organic demand is rapidly oxidized and removed from the system. As shown in the figure, the free chlorine can quickly re-establish the ORP without the need for elevated free chlorine and the rate of inactivation is sustained without increased free chlorine levels. Water and air quality are sustained, and the problematic symptoms common to contaminated pools are avoided.

Various compositions and methods of the invention are described below. Although particular compositions and methods are exemplified herein, it is understood that any of a number of alternative compositions and methods are applicable and suitable for use in practicing the invention.

The practice of the present invention will employ, unless otherwise indicated, conventional techniques of water chemistry, which are known to those of skill in the art. Such techniques are explained fully in the literature.

DEFINITIONS

Unless otherwise indicated, all terms used herein have the same meaning as they would to one skilled in the art and the practice of the present invention will employ, conventional techniques of microbiology and recombinant DNA technology, which are within the knowledge of those of skill of the art.

As used herein, the terms, "comprising" or "comprises" as used with reference to a catalyst of the invention means the catalyst, regardless of its chemical composition, contains the disclosed transition metal. For example, the transition metal can be in the form of an: oxide, salt, ligand complex, alloy, or element which contains some portion of the elemental transition metal. With exposure to the aqueous solution and sulfate free radical precursor, the transition metal catalyst induces a catalytic effect resulting in the formation of sulfate free radicals.

As used herein, the term "inactivation" is used with reference to the ability to deactivate, kill, or destroy an organism.

The term "persulfate donor" is used herein with reference to any compound or composition that includes at least 0.5 wt % of a $S_2O_8^{2-}$ donor, such as sodium persulfate, potassium persulfate, and PMPS (potassium monopersulfate) produced from oleum. The term "persulfate donor" may be used interchangeably herein with the term "persulfate", in particular with reference to $S_2O_8^{2-}$.

As used herein, the term "rate of inactivation" means the time based measurement required to achieve a level of inactivation of an organism. An increased rate of inactivation means the time required to deactivate, kill, or destroy an organism is reduced.

As used herein, the term "undesired oxidants" is used to refer to oxidants including persulfate ($S_2O_8^=$) that are prone to accumulate and induce irritation.

As used herein, the term "pH buffering agent" is used with reference to chemical that alters the ratio of hydrogen ions and hydroxide ions in the solution to affect the pH in a desired manor. Various phosphates, borates, carbonates are examples of pH buffers. It will be understood that any buffer used by those of skill in the art to obtain and maintain desired solution pH may be used in the practice of the invention. For example, addition of sodium carbonate (soda ash) to a composition comprising potassium monopersulfate will result in a solution with reduced free acidity. The carbonate alkalinity consumes excess acidity resulting in an elevation in solution pH.

As used herein, the term "additional transition metal catalyst" is used with reference to a composition or solution which includes more than one catalyst in the system. This is desirable when selective catalyst are employed to provide broad effect. For example, copper ions are very effective at decomposing persulfate to form sulfate free radicals, but have little effect on monopersulfate. Alternatively, cobalt is very effective at decomposing monopersulfate to form sulfate free radicals but has very limited effect at normal pool water pH 7.2-7.6 at decomposing persulfate. By combining at least two catalysts in the system, broad spectrum decomposition occurs thereby enhancing the conversion of persulfate free radical precursors to sulfate free radicals.

As used herein, the term "barrier film" is used with reference to an additive used to segregate at least two components of a composition that maybe considered incompatible. Such incompatibility may be due to sensitivity to opposing pH, moisture, and/or reactivity. The type of barrier film, if at all required, is selected based on the nature of the components in the composition and their respective detriment to the composition, i.e. stability, reactivity, Department of Transportation (DOT) regulations, impact of composition performance and the like). Ideally barrier films not only substantially reduce the detrimental effects, but can also enhance the processing, handling, packaging requirements, DOT classification, storage, as well as performance of the composition in a given application. One example includes adding magnesium carbonate to sodium chlorite to reduce the reactivity of the sodium chlorite while effectively functioning as a enhancing flow of the powder and providing anti-caking characteristics to the blend.

As used herein, the term "substantially free" is used with reference to a pertaining to S2O8= means the accumulation of S2O8= in the water being treated, even when the composition results in the release of said compound, is less than about 2 ppm as S2O8=.

As used herein, the term "increased the rate of inactivation" means the time required to deactivate, or kill the microbiological organisms for a given concentration of free available chlorine or bromine is increased by uses the compositions and/or processes disclosed in the invention.

As used herein, the term "breakpoint" is used with reference to a process whereby a stoichiometric level of chlorine is added based on the concentration of ammonia in water to convert the ammonia into inert nitrogen gas. The accepted ratio based on weight percentages of chlorine to ammonia is 7.6:1 respectively. This process is also referred to as "breakpoint chlorination".

As used herein, the term "a given concentration of free halogen donor" is used with reference to a condition where for a consistent concentration or range of measured free halogen donor in the aqueous solution, a relative rate of inactivation and rate of oxidation of organics is achieved. When the same range of free halogen donor and conditions are met, then the aqueous solution is treated with composition and/or process of the invention, a measurable increase in the rate of inactivation of microbiological organism and oxidation of organic contaminants is achieved.

As used herein, the term "microbiological organisms" is used with reference to all forms of microbiological life forms including: parasites, bacteria, viruses, algae, fungus, and organisms encased in biofilms.

As used herein, the term "free halogen donor" is used with reference to a halogen source which acts as an active sanitizer when dissolved in water. Chlorine based free halogen donors form at least one of ($Cl_2$, HOCl, $OCl^-$) when added to water, whereby the species formed is pH dependent. Bromine based free halogen donors form at least one of ($Br_2$, HOBr, $OBr^-$), again the species being pH dependent.

As used herein, the term "potable water" is used with reference to water that can be consumed, such as in the case of drinking.

As used herein, the term "filtration" is used with reference to a process of physically removing or trapping water insoluble particles. Filtration typically requires passing water through a filter media such as sand or a membrane to trap the particles while allowing the water to pass thru the filter media.

As used herein, the term "peroxymonosulfate" encompasses the various species of the peracid chemistry and its various salts, whereby depending on the pH of the solution in which the peroxymonosulfate is added, the following species and combinations result: $H_2SO_5$ (Caro's acid), $HSO_5^-$, $SO_5^=$.

As used herein, the term "alkali metal salts of monopersulfate" includes but is not limited to potassium monopersulfate, and/or sodium monopersulfate. Potassium monopersulfate is commercially available under the trade names Caroat® (Degussa Initiators GmhB) and Oxone® (E.I. DuPont). Synonyms include peroxymonosulfate.

"Monopersulfate donor" can be any convenient source of monopersulfate. Monopersulfate dissolved in water forms $HSO_5^-$, and/or $SO_5^=$ ions depending on solution pH.

As used herein, the term "aquatic facility" is used with reference to all structural components and equipment in contact with the water from an aqueous system. Examples of aquatic facilities include, but are not limited to, water parks, theme parks, swimming pools, spas, mammal habits at zoos, features such as fountains, waterfalls and the like.

As used herein, the term "skimmer" and "gutter" systems are used with reference to a portion of an aquatic facilities water circulating system. Skimmers and gutter systems collect and transport surface water from the main body of water comprising the swimming pool, spa, water-park ride etc. The water is pumped, filtered, and sometimes treated before being returned to the main pool or spa water. Treated added to the skimmer or gutters will contact the filter media as the water is circulated through the system.

As used herein, the term "Aquatic Facility Circulating System" as defined inhere is part of the aqueous system of the aquatic facility comprised of at least: a contained body of water such as a pool, a means of collecting surface water (such as a gutter or skimmer system), a "main drain" which collects water from the bottom of the aqueous system, pipes to transport the said collected water(s) to a pumping system comprised of at least a pump, a filter system to remove water insoluble matter, and a piping return system that returns the circulated water back to the contained body of water (pool).

As used herein, the term "chlorite donor" describes a compound that contributes chlorite anions to the water. Chlorite donors include chlorine dioxide since it can be reduced to chlorite. Tetrachlorodecaoxide is also to be considered an effective chlorite donor for a similar reason as chlorine dioxide. Preferred chlorite donors include alkali metal salts of chlorite exemplified by sodium chlorite.

As used herein, the term "free flowing powder" means the composition(s) have a consistency of a pourable powder and/or granules.

As used herein, the term "bodily discharge" is the release of at least one of: fecal matter, blood, stomach fluid into the aquatic facilities circulating system.

As used herein, the term "registered sanitizer" means the United States Environmental Protection Agency regulates the labeling and use of the sanitizer.

As used herein, a "persulfate donor" is any compound that includes at least 0.5 wt. % of a $S_2O_8^{2-}$ donor, such as sodium persulfate, potassium persulfate, and PMPS (potassium monopersulfate) produced from oleum.

As used herein, the term "sulfate free radical precursor" can be used with reference to either a donor of persulfate ($S_2O_8^{=}$) and/or monopersulfate ($HSO_5$). While alkali metal salts of monopersulfate exemplified by potassium monopersulfate typically comprise persulfate, it will be shown that certain catalyst (i.e. Co, V, Ru, Ce, Fe, Mn, Ni) can effectively produce sulfate free radicals and subsequent free radicals from monopersulfate. Monopersulfate being user friendly for many applications and non-irritating even by maintaining a residual while mammals are present, is a preferred choice of the invention for generating free radicals. Also, potassium monopersulfate and peroxymonosulfate can be produced without persulfates as disclosed in Martin et. al. U.S. Pat. No. 7,090,820.

As used herein, the term "cyclic process" relates to the recycling of substantially inert anions comprising bromide, chloride, and chlorite into their oxyhalogen surrogates, exemplified by hypobromous acid, hypochlorous acid, and chlorine dioxide respectfully.

As used herein, the term "recovered halogen anions and chlorite anions" refers to bromide and/or chloride ions in the aqueous solution that result from the reduction of their respective and more powerful oxidizing predecessor's hypobromous acid and hypochlorous acid and the chlorite ions that result from the reduction of chlorine dioxide.

As used herein, the term "chlorite anion donor" is a compound that comprises an alkali metal salt comprising chlorite anions $ClO_2^-$.

As used herein, the term "chlorite anion" is comprises chlorite having the general formula $ClO_2^-$.

As used herein, the term "recycled" means at least some portion of the recovered halogen anions and chlorite anions are regenerated to their respective oxyhalogen compounds, followed by reduction back to their respective anions, and where the process is repeated.

As used herein, the term "effective amount of catalyst" relates to having sufficient amounts of catalyst to sustain the concentration of catalyst within the desired range in the aqueous system in order to produce sulfate free radicals at a sufficient rate to maintain the desired results.

As used herein, the term "active catalyst" describes catalyst that can actively decompose the sulfate free radical precursor to form sulfate free radicals. Catalyst that is bound by stoichiometric levels of ligand or oxidized and insoluble may not induce decomposition and therefore is not considered active catalyst.

As used herein, the term "residual halogen anion" is the concentration of reactive anions comprising chloride and bromide that can be regenerated to their respective oxyhalogen species regardless of the source of the residual. The sources include addition to the aqueous solution, byproduct from the reduction of a parent oxyhalogen compound.

As used herein, the term "residual chlorite anion" is the concentration of chlorite anion that can be regenerated to chlorine dioxide regardless of the source of the residual. The sources include addition of chlorite anion to the aqueous solution, and/or a byproduct from the reduction of a parent chlorine dioxide.

As used herein, the term "halogen anion donor" is an alkali metal salt comprising at least one of a chloride and/or bromide anion. Examples include but are not limited to: sodium bromide, and sodium chloride.

As used herein, the term "shock dose" represents a level of treatment applied to the aqueous system at a high enough rate as to obtain a chlorine dioxide concentration of greater than 1.0 ppm. A feed system can be used to apply a "shock dose" of treatment however more common practices include broadcasting or decanting the chemicals all at once or in rapid succession to produce a high concentration in a short period of time.

As used herein, the term "dilute concentrations of chlorite" represents a chlorite anion concentration measured as $ClO_2^-$ of less than 100 ppm.

DETAILED DESCRIPTION OF THE EMBODIMENT(S)

Processes and Compositions of the Invention

The invention is based on the discovery that certain transition metal catalyst can selectively and efficiently decompose sulfate radical precursors such as potassium monopersulfate to produce sulfate free radicals. This process can be carried out in-situ to the application at a broad range of pH.

Furthermore it has been discovered that the in-situ generation of sulfate radicals can efficiently generate powerful oxyhalogen's such as hypobromous acid, hypochlorous acid, and chlorine dioxide from their respective bromide, chloride, and chlorite anions. Of great surprise and importance is the efficient generation can be carried out at near neutral pH and with relatively low concentrations of anions.

Using the process and compositions of the invention, it is now possible to effectively reduce the use and cost of expensive reagents such as sodium bromide and sodium chlorite to sustain an effective concentration of chlorine dioxide in an aqueous system. Furthermore, it is now possible to sustain higher concentrations of chlorine dioxide with the effect of increasing the rate of inactivation of microbiological organisms, including *cryptosporidium parvum*.

Further still, the synergistic effects of combining in-situ generation of sulfate free radicals and chlorine dioxide allows for enhanced inactivation due to the ability of the sulfate free radicals to accelerate decomposition and subsequent mineralization of the organic demand. By reducing the demand in an aqueous system, the chlorine dioxide and other oxidants such as hypobromous acid and hypochlorous acid elevate the oxidation potential of the aqueous solution. Higher oxidation potential represents increased oxidative power of the solution and subsequent increased inactivation rates.

Studies performed to determine inactivation rates of microbiological organisms such as *cryptosporidium parvum* are almost always performed in demand-free-water to remove competing reactions created by the demand for the oxidant. While these studies demonstrate the potential an oxidizing disinfectant has for inactivating a specific organism, it does not replicate the inactivation rate that will be obtained in aqueous systems that contain oxidant demand.

In the reference prior art, it has been demonstrated that the in-situ generation of sulfate free radicals can effectively decompose organic demand in an aqueous system. Because the sulfate free radicals are so powerful (2700 mV) and function as true oxidizers in that they extract electrons and do not favor oxygen addition or hydrogen abstraction like ozone and hydroxyl radicals respectively, reactions between organic demand and sulfate free radicals induces radical formation on the organic compound. This is believed to lead to any number of propagation steps, such as hydroxylation with water, oxygen addition from dissolved oxygen, and autocatalytic decomposition. Also because sulfate free radicals are so effective at extracting electrons, factors such as steric hindrance and bond strength that would otherwise require high concentrations and extended periods of reaction time with weaker oxidants are effectively initiated and propagated toward their termination products.

Furthermore, the in-situ generation of sulfate free radicals using the compositions and processes disclosed in this and the reference prior art induces the accelerated rate of decomposition in the bulk of the water comprising the aqueous system which is where the contaminants are added to the system. This eliminates the need for treatment systems that are restricted to the circulating system such as in the case of an aquatic facility utilizing UV or ozone thereby dramatically reducing the time to decompose the demand.

As a result, it has been demonstrated that by utilizing in-situ generation of sulfate free radicals to accelerate the decomposition and mineralization of organic demand combined with chlorine dioxide effectively allows for control of *cryptosporidium parvum* with inactivation rates like those reported in demand free water. This in itself is of significant importance considering that *cryptosporidium parvum* is listed by the U.S. EPA as a “Hazard of Significant Public Interest” and that no existing processes or compositions exist to achieve these inactivation rates in contaminated aqueous systems like aquatic facilities.

In co-pending applications it was discovered that certain transition metal catalysts can be combined with persulfate based compositions and their respective solutions to produce powerful (2700 mV) sulfate free radicals resulting in enhanced sanitizing and oxidizing efficiency of the resulting solution.

The disclosed invention is based on the discovery that the in-situ generation of sulfate free radicals in the presence of relatively low concentrations of selective anions comprising chloride, bromide and chlorite induces formation of their corresponding oxyhalogen surrogates such as hypochlorous acid, hypobromous acid and chlorine dioxide respectively, even at near neutral pH.

Efficient regeneration of relatively low concentrations of selective anions at near neutral pH opens the pathway for sustaining a cyclic system resulting in recycling of substantially inert anions into powerful and effective oxidants and disinfectants. The oscillating system is achieved by the process of providing an effective amount of sulfate free radical precursor to an aqueous solution while sustaining in said aqueous system an effective amount of: catalyst that decomposes the said precursor into sulfate free radicals; at least one of chloride and bromide anions; and chlorite anions. The chlorite anions are then regenerated into chlorine dioxide by oxidation from any of: sulfate free radical, sulfate free radical precursor, hypobromous acid and hypochlorous acid. This cyclic system can also be sustained while keeping the concentration of persulfate anions ($S_2O_8^{=}$) in the aqueous system at less than about 2.0 ppm when mammals are in said aqueous system such as in the case of a swimming pool to reduce the potential for irritation.

The invention provides for compositions and a process for increasing the rate of inactivation of microbiological organisms and oxidation of oxidation resistant compounds in an aqueous system.

The disclosed process for a cyclic system of the invention reduces the use and cost of expensive precursors exemplified by sodium bromide and sodium chlorite, and further provides the benefits of synergistic oxidation and inactivation from the combined effects of multiple oxidizers in the main-body of water comprising the aqueous system, rather than a side-stream or as part of the circulating system such as when an ozone system or Ultraviolet light system is incorporated into the circulating system of a swimming pool. Therefore, the powerful effects of synergistic inactivation and oxidation as well as the benefits of the regenerative power of the cyclic system are carried out in the water where intimate contact with the contaminants is being made. This dramatically increases the efficiency of the oxidation and inactivation since lag times and system response time caused by circulation and distribution of treated water is all but eliminated.

A composition of the invention may comprise one or more of the sulfate radical precursor, catalyst, halogen anion, and chlorite anion.

A composition of the invention may also include: a coagulant; a ligand bearing complexing agent that stabilizes the catalyst; an optional barrier film; pH buffer, or an additional transition metal catalyst.

A ligand bearing complexing agent stabilizes the catalyst thereby reducing its catalytic activity, and/or increasing its solubility thereby reducing potential for precipitation in the oxidizing environment. Typical ligand bearing complexes are exemplified by but not limited to: citric acid, ethylene diamine tetracetic acid (EDTA), hydroxyl ethylidene diphosphonic acid (HEDP), and pyrophosphate.

An optional barrier film for use in compositions of the invention segregates at least one of: the halogen anion exemplified by sodium bromide; chlorite donor exemplified by sodium chlorite; and the sulfate free radical precursor exemplified by potassium monopersulfate; and where the barrier film is exemplified by magnesium carbonate and fumed silica.

A preferred composition of the present invention comprises: potassium monopersulfate as the sulfate radical precursor, a catalyst comprising cobalt, a halogen donor comprising sodium bromide, and a chlorite donor comprising sodium chlorite.

The ratios of components comprising the composition can vary based on the feed rates and potential use of other free halogen donors such as sodium hypochlorite commonly used as a disinfectant in water. However, the general chemistry in an aqueous system comprising the cyclic process of the present invention will comprise: 1 to 1000 ppb of catalyst measured as elemental metal; at least one halogen anion selected from bromide anion having a concentration of 0.5 to 1000 ppm, and chloride anion having a concentration of 10 to 10,000 ppm; and a chlorite anion concentration ranging from 0.1 to 100 ppm; and whereby the sulfate free radical precursor is applied to the aqueous system at a rate sufficient to sustain a chlorine dioxide concentration of about 0.1 to 20.0 ppm with a pH of from about 5.0 to 9.0, more preferably from about 6.0 to 8.0, and most preferably from about 6.5 to 7.8.

The components comprising the composition of the present invention can be applied to the aqueous system as an all-in-one composition or as multiple bundled or individual components.

An example of the preferred embodiment of the cyclic process of the present invention consist of: a catalyst comprising cobalt having a concentration of about 5 to 500 ppb; a bromide anion concentration from about 2 to 100 ppm; and a chlorite anion concentration from about 0.1 to 10 ppm; and addition of an effective amount of potassium monopersulfate to at least sustain a chlorine dioxide concentration of about 0.1 to 5.0 ppm. Additional potassium monopersulfate can be applied to provide additional sulfate radical formation and subsequent decomposition of contaminants being added to the system such as bather waste in swimming pools or bacteria and organic contaminants in vegetable washing processes used in the agricultural industry.

The microbiological organism activity controlled by the cyclic process may be: parasitic organisms such as *Cryptosporidium* and *Giardia*; bacteria; viruses; algae; fungus; and biofilms.

The sulfate free radical precursors useful in the cyclic process are selected from potassium monopersulfate, sodium persulfate, potassium persulfate, and in some cases ammonium persulfate. Other alkali metal salts of monopersulfate or caro's acid could be used if either generated on-site or generated and applied within a reasonable time period from production so that the activity of the oxidant cost effectively supports the cyclic process disclosed. The preferred sulfate free radical precursor is potassium monopersulfate due to its ease of use and efficient sulfate free radical formation when used with selective catalyst exemplified by cobalt and ruthenium. Other catalyst may be used such as those comprising: iron, manganese, vanadium, cerium, and nickel. Furthermore, other transition metals may also provide catalytic effects with monopersuflates and persulfates that could be effectively used. The examples of catalyst provided should not be deemed to exclude other catalyst that are effective at in-situ generation of sulfate free radicals.

Sodium persulfate and sodium persulfate can be used as the sulfate free radical precursor provided the catalyst concentration is sufficient to prevent the concentration of persulfate anion from exceeding 2.0 ppm when used in an aquatic facility. Also, the catalyst activity must be sustained by replenishment with fresh catalyst as typical catalyst such as silver, copper, and iron oxidize and precipitate at near neutral pH thereby making the catalyst inactive as a catalyst. Ligands can improve this limitation, however in high demand applications such as swimming pools and vegetable processing, catalyst replenishment will be required due to the higher rate of sulfate radical production required to sustain the desired level of oxidants and more specifically chlorine dioxide. The problems of catalyst precipitation, removal and expense may begin to overshadow the benefits of a more efficient recycling of inert anions as compared to the potassium monopersulfate with cobalt catalyst sulfate free radical generating system.

In some embodiments a composition for use of the invention is a free flowing powder, wherein the composition is applied by broadcasting across the surface of the pool or by decanting into a desired location of the aqueous system such as an aquatic facility's circulating system or laundry washing machine.

In other embodiments, a composition of the invention is formed into a solution by contact with water then applied to a convenient location into the aqueous system such as an aquatic facility's circulating system or vegetable wash basin.

In yet other embodiments, a composition of the invention is an agglomerate that can have any convenient geometric configuration, e.g., a tablet.

The agglomerated composition may further comprise a binding agent that enhances the tablets formation and stability.

A composition of the invention may be provided as separately packaged components such as a kit. This approach provides greater flexibility in optimizes the chemistry of the aqueous system such as in the case of applying a "shock" treatment comprising a higher single dose application. This approach may be preferred such as in the case of a fecal release into a swimming pool to increase the concentration of sulfate radicals to accelerate the decomposition of the excess organic contamination.

The components of a composition of the invention may be added to aqueous system separately, at the same time, or at different times to achieve the desired results.

The invention further provides methods for increasing the rate of inactivation of microbiological organisms in an aqueous solution treated with registered sanitizer comprising at least one of a free halogen donor and chlorine dioxide.

Various embodiments of the disclosed compositions of the invention can be applied as shock treatments to recover a contaminated aqueous system, and/or fed while the contaminants are being added to the aqueous system.

Methods of treating water in an aqueous system to enhance the rate of inactivation of oxidation resistant microbiological organisms and decomposition of organic contaminants are disclosed. Without limiting the applications, examples of an aqueous system may be an aquatic facility, agricultural processes such as washing of vegetables, or laundry washing.

Sulfate Free Radicals

While sulfate free radicals can be produced from persulfate and other transition metals catalyst, the amount of catalyst for a given amount of persulfate is substantially higher in this system than in the monopersulfate system. Using the methods of the invention wherein the treated aqueous solution remains substantially free of residual persulfate, in the decomposition of persulfate and subsequent formation of sulfate free radicals, the transition metal catalyst is depleted and must be replaced for continued decomposition of persulfate to occur. If it is not replenished, residual persulfate will persist. While providing the benefit of enhanced oxidation of oxidation resistant compounds and eliminating the irritation of mammals during or after application to the aqueous system, the expense is much higher and the removal and replenishment of catalyst are troublesome. Also, it is desirable to remove the spent catalyst which is enhanced by precipitation with a coagulant to prevent staining and/or concentrations of spent catalyst that exceed allowable limits in drinking water and swimming pools.

Another benefit of the preferred invention is that low levels of catalyst can be applied to effectively produce free radicals from large quantities of monopersulfate, making the compositions of the invention extremely cost effective and suitable to a broader range of applications.

The invention provides a composition and a process for removing the COD and/or TOC from aqueous systems and for enhancing the rate of inactivation of microbiological organisms. With the invention, the organic compounds are oxidized thereby reducing the demand on the other oxidants used to enhance inactivation of the microbiological organisms. Furthermore, the formation of trihalomethanes ("THMs") and chloramines is significantly reduced and the quality of air and water around aquatic facilities is enhanced. This is particularly important wherein the aquatic facility is indoors or enclosed.

Aqueous systems such as vegetable washing processes used in the agricultural industry experience similar chloramines and THM problems due to reactions with chlorine and organic based demand comprising nitrogen. Application of the process and compositions of the present invention can effectively reduce the formation of these undesirable compounds while enhancing inactivation rates, thereby increasing production rates.

When the sulfate free radical precursor is applied to water in the presence of the catalyst, sulfate free radicals are formed that effectively decompose the organic compounds while preventing the accumulation of persulfate. Furthermore, the sulfate free radicals efficiently oxidize the anions of bromide, chloride, and chlorite resulting in the formation of their respective oxyhalogens comprising hypobromous, hypochlorous, and chlorine dioxide. Furthermore, residual hypobromous acid and hypochlorous acid also activate chlorite anions to generate chlorine dioxide. These cyclic processes are sustainable as long as the anions of the oxyhalogen species are present, and the sulfate free radical precursor is applied to the system containing the desired catalyst in an active form.

Some of the theorized reactions are as following. Note that the presence of an asterisk represents a radical:

$S_2O_8^{2-}$+Catalyst>>>Catalyst+$SO_4^{2-}$+$SO_4^-$*

$SO_4^-$*+Organics>>>[ ... many steps ... ] $CO_2$+$H_2O$ $Co^{2+}$+$HSO_5^-$>>>$Co^{3+}$+$SO_4^-$*+$OH^-$ $Ag^+$+$S_2O_8^{2-}$>>>$SO_4^-$*+$SO_4^=$ $SO_4^-$*+$Cl^-$>>>$SO_4^{2-}$+$Cl$*

$Cl$*+$Cl^-$>>>$Cl_2^-$*

$Cl_2^-$*+$Cl_2^-$*>>>$Cl_2$+$2Cl^-$ $Cl$*+$Cl$*>>>$Cl_2$ $Cl_2$+$H_2O$>>>$HOCl$+$HCl$ $ClO_2^-$+$SO_4^-$*>>>$ClO_2$+$SO_4^=$ $Br^-$+$SO_4^-$*+$H_2O$>>>$HOBr$+$SO_4^=$+$H^+$ $HOBr$+$ClO_2^-$>>>$ClO_2$+$Br^-$+$OH^-$

The efficiency and rate of free chlorine generation from the reaction of sulfate free radicals with chloride anions is magnitudes greater than that achieved with monopersulfate especially at near neutral pH and low concentrations. The formation of hypobromous acid is even greater, and hypobromous acid being more active at near neutral pH than the hypochlorous acid due to the equilibrium of the two species of oxyhalogens at near neutral pH, the hypobromous acid is more effective at activating residual chlorite anion in the water to produce chlorine dioxide.

The reduction of these oxyhalogens generally involves release of their subsequent anions, which are then regenerated back to the desired oxyhalogens by oxidation from sulfate free radicals.

This cyclic process reduces the amount of reagents required to sustain the concentration of chlorine dioxide in the aqueous system, and with excess sulfate radicals being produced, enhances the effectiveness of the disinfectants by decomposing the contaminants that impose a demand on the disinfectants. This synergistic process enhances the oxidation potential for a given concentration of disinfectants and subsequently elevates the inactivation rates.

Equipment and Processing

Powder compositions can be all-in-one treatments or be any combination of components which are then applied together or separately. In most applications it would be desirable to limit the composition to no more than two components for simplicity reasons. An overview of how to produce an all-in-one composition is exemplified.

To form the powder mixture, the catalyst is admixed with the sulfate free radical precursor in a container such as a ribbon mixer or other common commercially available blending/mixing device. In compositions comprising a halogen donor and chlorite donor they to are admixed to form the final composition. Depending on the sulfate free radical precursor and free halogen donor, a barrier film may be incorporated into the mixture. The barrier film can be added during any point during the blending/mixing process, but preferably it is added early in the mixing process to effectively pre-coat at least one of either the sulfate free radical precursor, halogen donor and chlorite donor.

In some embodiments, the composition may be formed into an agglomerate, e.g., to form granules or tablets having any convenient geometric configuration. The techniques and equipment for blending/mixing and agglomerating is widely available from toll blenders and packagers, as well as commercially available manufacturers such as Fitzpatrick Company based in Elmhurst, Ill. Barrier films are incorporated into the composition when the stability or reactivity of the final composition is considered to be unacceptable. The type of barrier film is selected based on the behavior of the components, stability or reactivity of the composition. However, magnesium carbonate and fumed silica are examples of effective barrier films.

Barrier films such as magnesium carbonate sold under the trade name Elastocarb™ by Akrochem have very low bulk density thereby increasing the segregation of constituents in the composition for a given weight percentage of Elastocarb™ more so than high density compounds like magnesium sulfate heptahydrate. By volume comparison, it take about 15 wt % of magnesium carbonate to provide the amount of segregation than the magnesium sulfate heptahydrate. Furthermore, upon exposure to temperatures of about 200 degrees celcius, the Elastocarb™ releases both water and carbon dioxide in an endothermic (energy consuming) reaction, thereby cooling the reaction while the released vapors displace the fuel from the surface. Combining magnesium carbonate into the composition not only improves the stability of the composition, it can improve the processing, packaging, shipping, storage, and handling of the final product by making it less reactive.

Furthermore, barrier films need not be added during the processing of the composition. They can be added to one or more of the components of the composition as part of that components manufacturing process. Potassium monopersulfate for example is typically treated with magnesium carbonate to coat the granules and function as an anti-caking agent so that the resulting product is free flowing (reference U.S. Pat. No. 7,090,820B). Additional barrier film can be applied such as in cases of combined the potassium monopersulfate with sodium bromide and sodium chloride.

All-in-one compositions can be better stabilized by applying Fumed silica having either a hydrophilic or hydrophobic characteristics using a magnetic assisted impaction coater (MAIC). Magnesium carbonate is also a suitable coating.

The fumed silica can be applied either as a liquid or as a power.

Unlike mechanical mixing such as V shaped blender or ribbon mixer, the use of MAIC provides for a coating having improved distribution and adherence onto the substrate, thereby improving protective features of the coating.

The agglomerates may contain an agent that restricts the dissolution rate of the agglomerate. Examples of such agents include a substantially water insoluble wax such as polyethylene wax, polyoxyethylene wax and their respective fatty acid ester wax. An agent can also be a mineral salt of a carboxylic acid having at least 16 carbons, such as calcium stearate and similar hydrocarbon based salts. Further still, the agent may be a gel-forming material such as a polaxamers, polyacrylic acid, polyacrylamide, polyvinyl alcohol, polysaccharides such as Xanthan, and various cellulose based derivatives. The gel-forming material forms a gelatinous structure upon being exposed to water, effectively controlling the rate at which the agglomerate dissolves in the water.

Some embodiments of the composition can be packaged as a ready to use kit for application to aquatic facilities after release of a bodily discharge (i.e. fecal, vomit, blood etc.). The kit can include pre-measured doses of the various compositions, pre-measured doses in one-time use polyvinyl alcohol sacks or bags, or comprise a supply of composition for multiple applications.

Depending on the application of the compositions, ligand forming complexing agents such as organic phosphonates (examples, HEDP) sold under the trade name Dequest® by Solutia, or aminopolycarboxylic based (EDTA, DTPA, NTA) sold under the trade names Versene® and Versenex® by Dow Chemical. can be employed to enhance the stability of resulting solutions. These complexes can also be employed to delay or slow the rate of decomposition so as to extend the decomposition process over an extended period of time. Application of complexing agents can also improve the efficiency of the catalyst decomposition thereby reducing the ratio of catalyst to sulfate free radical precursor. The ligand complexing agents can be complexed with the catalyst by making a solution comprising both the catalyst and ligand, then drying the solution using drying equipment such as a spray dryer and collecting the powder. The Complexing agent can also be admixed with the compositions, added to the water into which the composition is to be added. The formation of ligand complexed catalyst dramatically improves the stability of solutions comprised of high concentrations of the sulfate free radical precursor and catalyst.

The compositions of the invention can be applied using commercially available feed systems that dissolve either powders, granules or tablets of the compositions to form a solution, then dispensing the solution into the water to be treated. Examples of such feed systems include but are not limited to Polaris Watermatic G1000, Watermatic G7500, Pulsar II, III, and IV Calcium Hypochlorite feed systems, as well as various erosion feeders for feeding bromine and chlorine tablets.

Also, the composition of the invention can be applied directly to the water to be treated by decanting or broadcasting the composition into or across the surface of the water.

It is anticipated that various modifications to the disclosed processes for increasing the rate of oxidation and inactivation of resistant compounds and organisms can be achieved while remaining within the scope of the invention. For example, water treated with the compositions and process of the cyclic system can be irradiated with ultra violet radiation to further inactivation of microbiological organisms. Ozone can also be added to the treated system to enhance oxidation and inactivation of microbiological organisms, potentially eliminating or at least supplementing free halogen sanitizers and/or chlorine dioxide.

EXAMPLES

Example 1

Persulfate Decomposition 1000 mL of a water-based stock solution containing 7.0 ppm persulfate was prepared by adding potassium persulfate (purchased from Sigma-Aldrich) to water and adjusting the pH to 7.2 using sodium bisulfate. The persulfate level was initially and periodically tested using ammonium thiocyanate and ferrous iron in an acidic solution. The stock solution was divided into 2-500 mL samples, and magnetic stirring rods were added to each sample. Using the magnetic stirrer, each sample was vigorously mixed to achieve a vortex reaching approximately half the distance to the stirring rod.

TABLE 1

Persulfate Decomposition Rate

| Lapsed Time (Hrs.) | Persulfate Conc. (ppm) with 0.63 ppm Ag catalyst | Persulfate Conc. (ppm) with 0.31 ppm Ag catalyst |
| --- | --- | --- |
| 0 | 7.0 | 7.0 |
| 3 | 4.2 | 5.6 |
| 5 | 2.1 | 4.2 |
| 7 | <1.0 | 2.8 |

Table 1 shows that the persulfate concentration decreased with time. The test results in Table 1 illustrate that the catalyst comprising silver (Ag), and sourced from Silver nitrate ($AgNO_3$) under conditions like those experienced in pools, can effectively decompose the persulfate irritant.

As the reactions proceeded, the pH of the solution increased. Therefore, during the test period, the pH was measured every 30 minutes and a solution of sodium bisulfate was administered as needed to maintain the pH at a range of about 7.2 to 7.5.

The test result indicates that when the reaction occurs in COD-laden water, the sulfate free radicals will enhance the effectiveness of the treatment (e.g., PMPS treatment) for decomposing the COD. The enhanced effectiveness in COD decomposition is related to the ability of sulfate free radicals to efficiently induce radicals on the organic complex and cleave bonds that otherwise would resist oxidation from the weaker monopersulfate. Moreover, with the persulfate irritant being removed rapidly with the catalyst, the invention allows PMPS (which is usually accompanied by some persulfate) to be applied while swimmers and bathers are present in the water.

The composition, which is substantially soluble in water, may be made into a solution before being added to the COD-laden water. In some cases, the solution is prepared in a container before being delivered to the pool by an eductor system, a chemical metering pump, or pressure differential between the inlet and outlet water supply of the container. In other cases, the solution is made by adding the composition (e.g., in agglomerated form) to the circulating water of the system.

If desired, additional persulfate donor can be fed separately to the water to further enhance the formation of sulfate free radicals.

Example 2

Algae Destruction

In an outdoor 360,000 gallon pool contaminated with planktonic algae, 200 lbs of the cobalt monopersulfate composition comprising 99.3 wt % Potassium monopersulfate, 0.5 wt % Magnesium Carbonate, and 0.2 wt % Cobalt Acetate as previously disclosed was added to the system by broadcasting. 40 pounds of soda ash was added to neutralize excess acidity, and the ORP controller was set at 780 mV.

In 72 hours, the pool water sparkled with no visible signs of algae. The ORP was consistently achieving 780 mV with 2.0-2.5 ppm of free chlorine.

For comparison purposes, the same pool system during the opening procedure was treated with 500 lbs of calcium hypochlorite and allowed to circulate for 7 days before obtaining the water clarity and being allowed to open to swimmers.

The superior speed and effectiveness of one of the compositions disclosed in this invention under real-world conditions is again highlighted. Algae can be resistant to control by chlorine due to organic contamination which induces a competing reaction for the chlorine, the structural integrity of cellulose that inhibits rapid destruction of the algae can be rapidly overcome using the powerful compositions of the invention.

Example 3

$K_2S_2O_8$ Destruction 99.8 grams of distilled water was weighed in a 250 ml beaker. 0.6 grams of $K_2S_2O_8$ was added to the beaker of water, placed on a magnetic stirrer and mixed until dissolved. Sodium bisulfate was added to suppress the pH, with a resulting pH of approximately 3.2. A sample of solution was diluted by carefully weighing out 99 grams of distilled water into a flask, followed by addition of 1-gram of solution and mixed. The diluted sample was tested using a Chemets® Kit K-7870. The resulting solution was measured as having a sodium persulfate concentration of approximately 49 ppm.

To the remaining sample of persulfate solution in the 250 ml beaker, 0.1 grams of cuprous chloride was added and mixed until dissolved, resulting a clear blue tinted solution about 2 minutes. A 99:1 dilution was again performed and tested using the Chemets Kit K-7870, resulting in a measurement of 0.0 ppm Example 4

Catalyst Precipitation 20 grams of potassium monopersulfate, 0.1 grams cuprous chloride and 80 grams distilled water was added to a 250 ml beaker and mixed on a magnetic stirrer until dissolved. 1 gram of solution was carefully measured and diluted with 99 grams of distilled water. The diluted sample was treated with sodium bisulfite to remove residual monopersulfate, the pH was then adjusted to 7.3 using a diluted solution of sodium hydroxide. The resulting clear solution was tested using a HACH Company Method 8506 bicinchoninate-powder pillow test procedure and a DR-2000 spectrophotometer. The resulting copper level was measured and corrected compensate for the dilution. The final result being 4.9 ppm as Cu.

A second 1-gram sample from the original solution was neutralized with sodium bisulfite, then treated with 2-grams of 0.1 wt % alum solution to achieve approximately 20 ppm as alum in the diluted solution. The pH was adjust with dilute sodium hydroxide to achieve a pH of approximately 7.3, mixed for about 5 minutes, then allowed to settle in a graduated cylinder. 25 ml of clear water was decanted and tested for copper, resulting a value of 0.78 ppm as Cu.

Example 5

PMPS Survival

A composition comprising 0.65 wt % aluminum sulfate, 0.35 wt % cuprous chloride, 99 wt % Caroat® was blended and packaged in 6 gallon plastic pails including a plastic bag liner.

50 lbs of the composition was added to 30 gallons of water and mixed for 120 minutes. About 1-liter of sample was removed and tested for both persulfate and available oxygen using standard iodiometric methods.

A diluted sample was prepared by adding 1-gram of sample to 999 grams of distilled water resulting in a solution containing an estimated 150 ppm of potassium monopersulfate triple salt, and approximately 4.5 ppm of potassium persulfate.

10 grams of diluted sample was treated with potassium iodide and titrated with thiosulfate solution to determine the total amount of titrant required to neutralize the oxidant level (135 drops)

To the second 10 gram sample 135 drops of thiosulfate solution was added to first neutralize the potassium monopersulfate. Sodium thiosulfate does not react with persulfate and therefore will allow the oxidant to remain for analysis. The resulting solution was tested using the Chemets® Kit K-7870 resulting in 0.0 ppm as sodium persulfate.

After approximately 24 hours of resting in a covered beaker, the remaining stock solution remained stable. No gas bubbles were observed on either the wall of the beaker or being released from the solution.

Example 6

Glycine Destruction 1000 ml of distilled water was treated with glycine to provide approximately 25 ppm of glycine and mixed till dissolved. Approximately 0.25 grams of cobalt acetate was added and mixed till dissolved. 0.5 grams of potassium monopersulfate was added and mixed till dissolved. Periodically the pH was adjusted by addition of a diluted solution of potassium carbonate. Also qualitative measure of oxidant measure was performed using a small 10 ml sample of solution treated with potassium iodide. The resulting solution would develop varying shades of orange to yellow, with orange indicating higher concentrations, fainter yellow indicating lower concentrations of treatment.

The pH was tracked since CO2 formation from conversion of the carbon based glycine with the resulting oxidant forms carbon dioxide which subsequently forms carbonic acid. When the pH suppression is reduced, the reaction between system oxidants and carbon is completed. After 105 minutes of reaction, the suppression of pH stopped. The test was allowed to continue while observing for an additional 15 minutes, after which time, 1.5 grams of 1% calcium hypochlorite solution was added to the solution.

After 20 minutes of continued mixing the solution was tested for free chlorine and combined chlorine resulting in: 7.0 ppm Free Chlorine, 0.0 ppm Combined Chlorine.

The test clearly illustrate that catalyst selection can impose a dramatically different effect with respect to solution stability and which oxidants are involved with in-situ generation of free radicals.

In one embodiment, a copper or silver catalyst can be included with a persulfate donor such as potassium monopersulfate which typically comprises from 2-5 wt % K2S2O8 to produce a solution rich in monopersulfate but substantially free of S2O8=. Further still the data illustrates the same invention using a persulfate rich donor such as sodium persulfate will allow for treatment of an aqueous solution with sulfate free radicals while keeping the treated system substantially free of S2O8=

In yet another embodiment of the invention, the composition can be formulated to allow effective catalytic decomposition of the persulfate, inactivation and subsequent precipitation of the spent catalyst, thereby preventing problems resulting from accumulation of the catalyst.

Another embodiment of the invention disclosed by the test results shows the dramatically increased rate of oxidation of organic compounds as well as the rapid decomposition of the oxidant itself. Further still, organic compounds that are highly resistant to the sulfate free radical precursor as well as other oxidants commonly used in the treatment of aquatic systems are readily oxidized by the resulting sulfate free radicals, exemplified by the potassium monopersulfate-cobalt acetate composition and its decomposition of cyanuric acid.

Of significant importance is the impact these compositions have on improving the inactivation rates of microbiological organisms as illustrated by the rapid increase in ORP resulting from the destruction of competing reactions that impede inactivation rates of free halogen donors, and in some embodiments the ability of solutions of the compositions to effectively decompose oxidation resistant compounds that would otherwise compromise sanitizer performance in system contaminated by free halogen resistant organisms (i.e. *cryptosporidium*).

Example 7

| Cobalt-Monopersulfate Solution Stabilization | | | | | | |
|---|---|---|---|---|---|---|
| Ligand | Catalyst | Catalyst as Elemental | MPS % solution pH ≈ 2.0 | 0 hr Result 199:1 dilution | 24 hr Result 199:1 dilution | 72 hr Result 199:1 dilution |
| N/A | CoSO4 | 20 ppb | 16.7 | very strong | very weak | ND |
| EDTA | CoSO4 | 20 ppb | 16.7 | very strong | very strong | very strong |
| HEDP | CoSO4 | 20 ppb | 16.7 | very strong | very strong | very strong |
| PBTC | CoSO4 | 20 ppb | 16.7 | very strong | Not Tested | very strong |

Figure 5A:
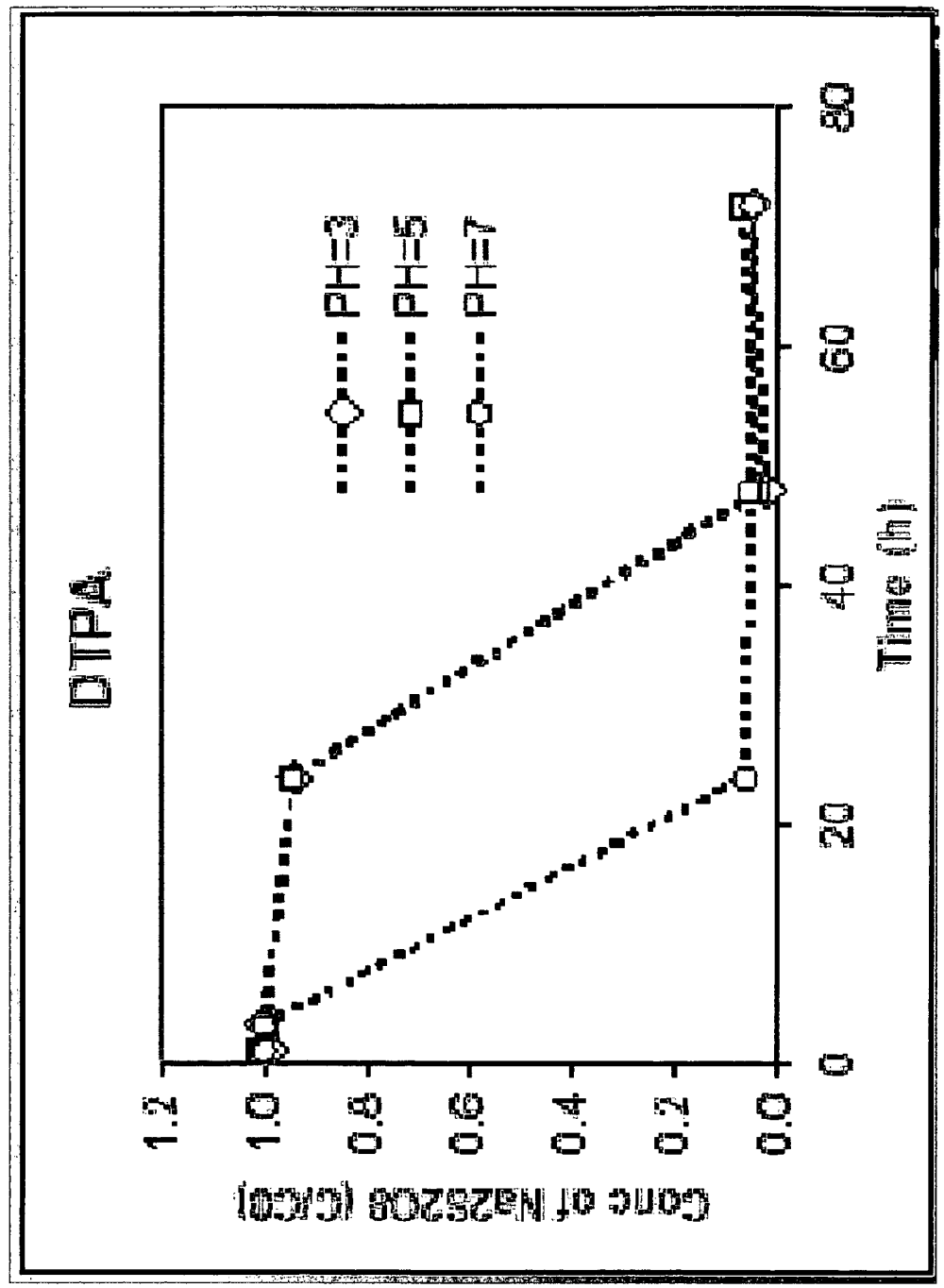
FIGS. 5A-D provide a graphic depiction of the stabilizing affect of various ligands in a sodium persulfate-iron system at various pHs. The data illustrates the selection of the proper ligand can effectively stabilize catalyzed persulfate solution at a specific pH, while allowing the catalyst to rapidly induce free radicals at another pH. Therefore, by including a properly selected ligand in the solutions of the compositions disclosed, the solution can be effectively stabilized for extended periods while maintaining a low pH with minimal loss of activity. However, when the solution is applied to a water system with elevated pH such as a pH of 7.0, the catalyst is activated and free radicals are formed.
Figure 5B:
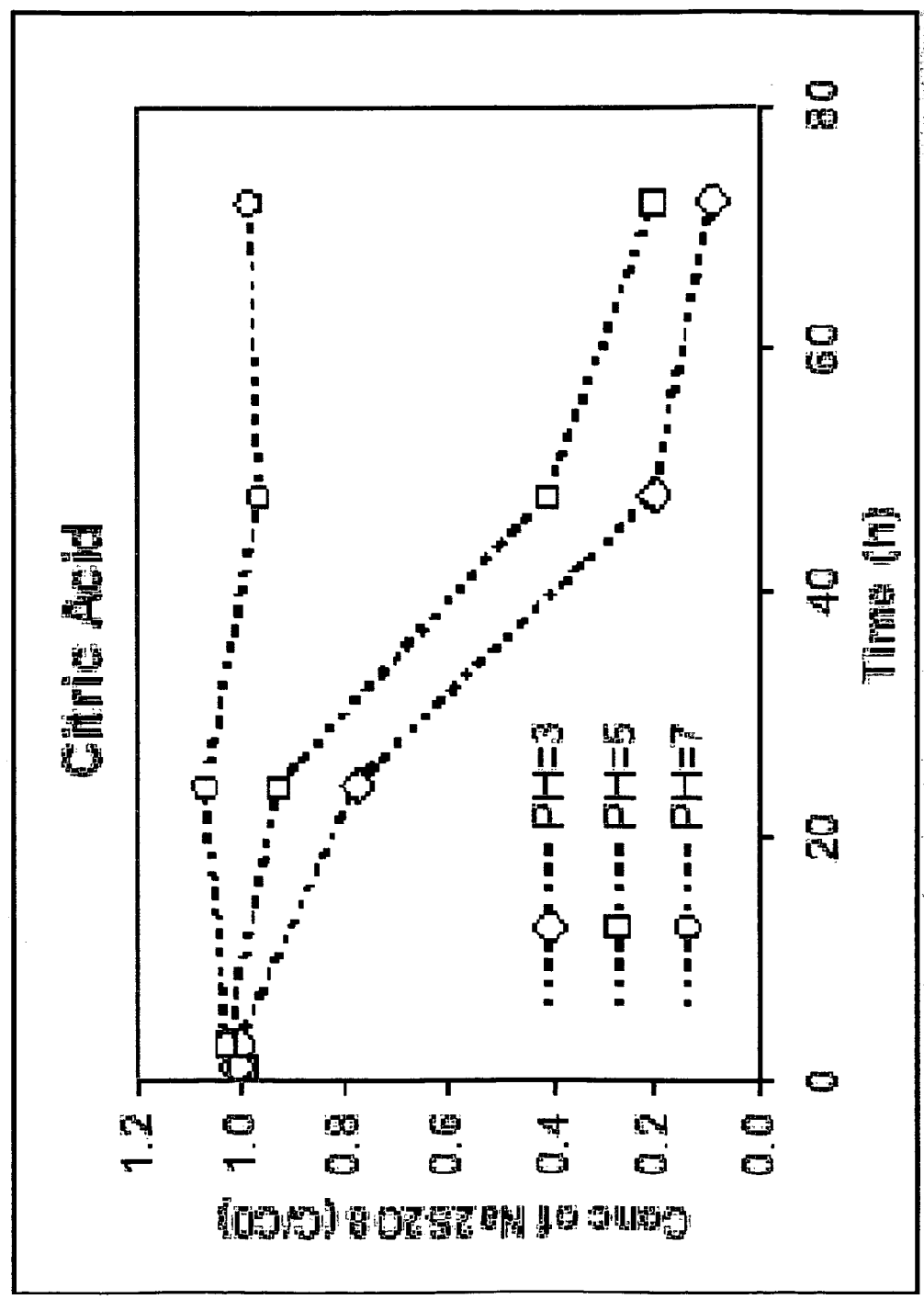
Figure 5C:
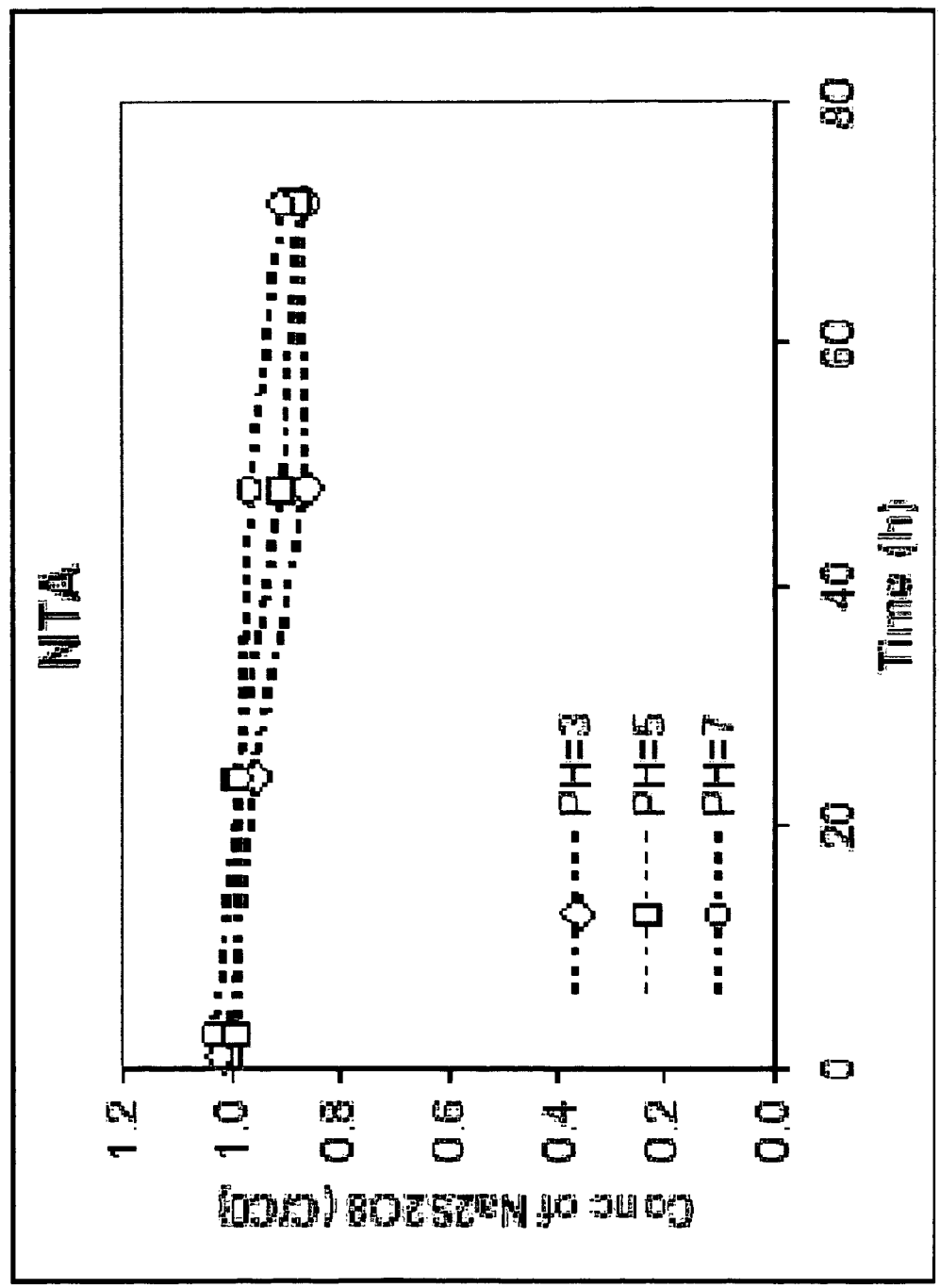
Figure 5D:
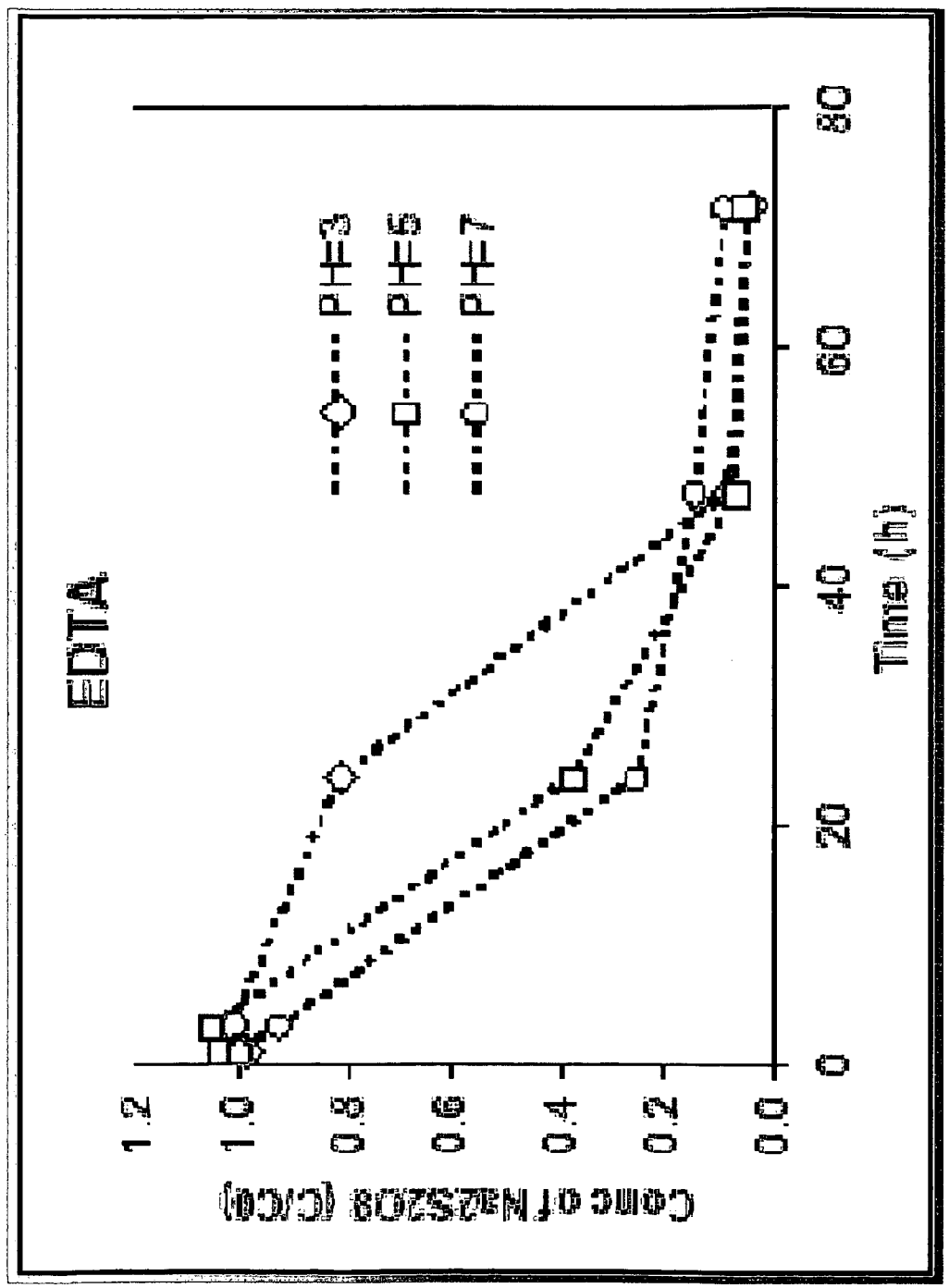

This table illustrates that concentrated solutions of MPS with cobalt catalyst present are decomposed at an unacceptable rate for solution storage. However, while the cobalt-MPS system is extremely effective at oxidizing organics including organic chelating agents, like FIG. 5, Table 1 illustrates that under the low pH conditions, various commercially available chelants effectively stabilize the low pH solution.

Although the foregoing invention has been described in some detail by way of illustration and example for purposes of clarity and understanding, it will be apparent to those skilled in the art that certain changes and modifications may be practiced. Various aspects of the invention have been achieved by a series of experiments, some of which are described by way of the following non-limiting examples. Therefore, the description and examples should not be construed as limiting the scope of the invention, which is delineated by the appended claims. The disclosures of all patents, publications (including published patent applications), database accession numbers, and depository accession numbers referenced in this specification are specifically incorporated herein by reference in their entirety to the same extent as if each such individual patent, publication, database accession number, and depository accession number were specifically and individually indicated to be incorporated by reference.

It is to be understood, however, that the scope of the present invention is not to be limited to the specific embodiments described above. The invention may be practiced other than as particularly described and still be within the scope of the accompanying embodiments.

Example 8

Cyclic System 500 ml of distilled water was treated with 20 mg $NaHCO_3$ resulting in 40 mg/l buffer. To this solution was added: 50 ppb as $Co^{2+}$, 10 ppm as Bromide anion, and 12 ppm as potassium monopersulfate. Starting pH was 7.45. After 20 minutes the corrected DPD measured 0.45 ppm as $Br_2$ and a residual oxidant (monopersulfate) of 2.0 ppm measured as $Cl_2$ with a pH of 7.35. After 40 minutes the measured results after converting free chlorine to free bromine was 0.9 ppm as $Br_2$ with a residual oxidant (monopersulfate) concentration of 1.4 ppm measured as $Cl_2$ with a pH of 7.43.

Example 9

500 ml of distilled water was treated with 20 mg $NaHCO_3$ resulting in 40 mg/l buffer. To this solution was added: 100 ppb as $Co^{2+}$, 50 ppm as Bromide anion, and 12 ppm as potassium monopersulfate. Starting pH was 7.24. After 20 minutes two sample were taken with the first sample having the corrected DPD measuring 1.8 ppm as $Br_2$ and a residual oxidant (monopersulfate) of 0.6 ppm measured as $Cl_2$. The second sample was first treated with the DPD reagent then treated with 1 ml of EDTA solution to neutralize residual monopersulfate that could reactivate bromide in the sample. The second sample had a corrected DPD value for $Br_2$ of 1.8 ppm. After 30 minutes the measured results after converting free chlorine to free bromine was 1.8 ppm as $Br_2$ with a residual oxidant (monopersulfate) concentration of 0.4 ppm measured as $Cl_2$ with a pH of 7.18.

The experiment was continued by adding 200 micro-liters of a 0.5 wt % solution of sodium chlorite providing 2.0 ppm as sodium chlorite or 1.18 ppm as chlorite anion. Starting pH after addition was 7.19. After 10 minutes two 25 ml samples were collected. Sample 1 was treated with 1 ml of glycine solution to remove residual free bromine while the other was tested without glycine. The glycine sample measured 0.6 ppm as $Cl_2$ while the glycine free sample measured 0.6 ppm as $Cl_2$ with a total oxidant of 0.8 ppm as $Cl_2$. The two samples were reported as $Cl_2$ to give results on an equivalent basis thereby providing ease of comparison.

Example 10

Example 10 was repeated except the cobalt catalyst was not added. Starting pH was 7.27. After 20 minutes the corrected DPD measurement was 1.35 ppm as $Br_2$ with a total oxidant of 2.2 ppm as $Cl_2$. A second sample was taken after addition of the DPD reagent, 1 ml of EDTA solution was added to neutral residual monopersulfate. The corrected DPD was 0.9 ppm as $Br_2$. After 40 minutes the results test were repeated with a DPD/EDTA of approximately 1.1 ppm as $Br_2$ and a total oxidant of 1.8 ppm. The final pH was 7.13.

Example 11

To 500 ml distilled water, 20 mg of sodium bicarbonate was added to provide 40 ppm buffer. 2.0 ppm sodium chlorite was added to provide 1.18 ppm chlorite anion. 100 ppb as $Co^{2+}$ was added, followed by 12 ppm potassium monopersulfate.

The pH at Time equals 5-minutes was 7.21. After 20 minutes a 25 ml sample was taken and a glycine DPD test was performed measuring 0.2 ppm as $Cl_2$.

Example 12

500 ml of tap-water supplied from the city of Chicago was treated with 160 ppm of $NaHCO_3$, 100 ppb as $Co^{2+}$, 100 ppm as $Br^-$, 1.18 ppm as $ClO_2^-$ and mixed. To this mixture, 24 ppm as potassium monopersulfate triple salt was added. The temperature was 71° F. The pH at a lapsed time of 3 minutes was 7.26. After 10 minutes of mixing with a magnetic stirrer, the pH was 7.36 and a 25 ml sample was taken and testing using a Glycine-DPD test for chlorine dioxide, and DPD followed by potassium iodide solution for free halogen+chlorine dioxide and total oxidant.

Glycine-DPD measured 1.2 ppm as $Cl_2$. This indicates a conversion of chlorite anion near 100% to chlorine dioxide. DPD measured 3.8 ppm as $Cl_2$ which indicates the combined measure of chlorine dioxide and free halogen (i.e. hypobromous and hypobromite). Total oxidant measured 4.2 ppm as $Cl_2$.

Based on these initial results, it was evident residual free bromine was present in an amount equal to about 2.6 ppm as $Cl_2$.

An additional 2.36 ppm as $ClO_2^-$ was added to the solution and allowed to react for 2 minutes. A distinct chlorine dioxide odor was detected just above the beaker. The solution pH was 7.49 at the time of collecting a 25 ml sample. Glycine-DPD measured 3.2 ppm as $Cl_2$.

Discussion of Examples 8-11

Based on example 11, it should take approximately 0.8 ppm free bromine measured as $Cl_2$ (1.8 ppm as $Br_2$) to produce approximately 0.6 ppm chlorine dioxide measured as $Cl_2$. In example 12, it became evident that nearly 100% of the initial dose of chlorite anion was converted to chlorine dioxide and residual free bromine existed in the solution. When 2.36 ppm as $ClO_2^-$ was added from a stock solution and reacted for 2 minutes, the chlorine dioxide level measured approximately 3.2 ppm as $Cl_2$. Considering a residual free bromine concentration measured as $Cl_2$ was 2.6 ppm, from example 11 we could expect a maximum increase in chlorine dioxide of 1.95 ppm measured as $Cl_2$, thereby provide a total chlorine dioxide concentration of approximately 3.15 ppm as $Cl_2$. The actual measured concentration was 3.2 ppm as $Cl_2$ which indicates all of the chlorite that theoretically could be converted to chlorine dioxide was reacted to produce chlorine dioxide.

Results clearly indicated that virtually all the chlorine dioxide that could be produced from the reactions with sulfate free radicals, potassium monopersulfate, and hypobromous acid was produced. The efficiency of conversion of chlorite anion to chlorine dioxide approaches nearly 100% as long residual oxidants are present to continue driving the reactions to consume any residual chlorite.

The efficiency of this process is surprising considering the extent to which the prior art has disclosed compositions and methods of producing chlorine dioxide in concentrated tablets and solutions to try and achieve chlorite conversions of 70%.

It is indeed extremely surprising that such dilute concentration of reactants can result in nearly 100% conversion at near neutral pH. The ability to efficiently generate chlorine dioxide in-situ by adding the reactant independently of one-another is of tremendous value to the industry.

It is clearly evident that the efficiency and rate of reaction of the systems employing sulfate free radical (monopersulfate with cobalt catalyst) is significantly greater than that using only monopersulfate. Comparing examples 9 and 10, the sulfate radical system produced nearly doubled the production of measured free bromine than the system using only monopersulfate. Also, the rate of monopersulfate decomposition is significantly higher in the catalyzed system. In example 10 which was un-catalyzed, the excess concentration of monopersulfate can interfere with the free halogen reading which is likely due to regeneration of bromide anions unless the monopersulfate is neutralized. With lower residuals of monopersulfate in example 9, there did not appear to be a detectable amount of interference a least within the time required to perform the titration.

The ability of the sulfate free radicals to generate free bromine and subsequent chlorine dioxide from chlorite anions is clearly evident. Furthermore the efficiency and rates of reaction are considerably higher with almost all (76%) of the measurable residual of monopersulfate being depleted after 20 minutes while the un-catalyzed monopersulfate system only consumed 36% of the monopersulfate with most of it being accounted for in the conversion of bromide to free bromine, and thereby retaining a significant residual.

Example 11 illustrates the sulfate radical can directly convert chlorite to chlorine dioxide independent of the presence of free halogen. While the conversion rate is not as high as the conversion of bromide to free bromine, the potential for sustaining a synergistic effect on chlorine dioxide generation is evident.

Example 9 clearly illustrated the efficiency of hypobromous acid to regenerate chlorite anions into chlorine dioxide. In fact the test showed that all of the measured free halogen was consumed converting chlorite to chlorine dioxide. This surprisingly high conversion at low concentration and near neutral pH is of significant benefit since it illustrates that chlorine dioxide can be produced in-situ to the process without the need for high concentrations which can lead to hazardous conditions.

Review of the Invention's Benefits:

All oxidizer based disinfectants such as ozone, chlorine dioxide, and chlorine to name a few experience reduced efficacy in sustaining inactivation rates when applied to system contaminated with oxidant demand. Systems such as aquatic facilities, vegetable washing, and laundry washing treated with oxidizing biocides will experience reduced inactivation rates due to the presence of demand for the oxidizers being applied unless the oxidation potential is sustained thereby requiring increased concentrations of oxidants and potential undesirable effects such as increased formation of trihalomethanes and chloramines.

It is advantageous to effectively decompose the demand at an elevated rate to effectively reduce or altogether remove the demand from the aqueous system so that the efficacy of the oxidizing biocide is sustained at low concentrations.

In prior applications it was clearly demonstrated that sulfate free radicals generated in-situ to the aqueous system dramatically accelerate the decomposition of organic demand, thereby elevating the oxidation potential of the aqueous system with reduced free chlorine levels.

It has now been demonstrated that the in-situ generation of sulfate free radicals is also beneficial at sustaining a cyclic system wherein a residual of chlorine dioxide is sustained by the conversion of chlorite anions to their oxyhalogen chlorine dioxide. This cyclic process is further enhanced by the presence of halogen anions exemplified by bromide and chloride.

The dual role of in-situ generated sulfate free radicals accelerating decomposition of oxidant demand while regenerating substantially inert anions into their respective oxyhalogens has tremendous benefit. Furthermore, the cyclic process and decomposition of oxidant demand occurs at near neutral pH and in-situ to the aqueous system. No side stream or full stream treatments such as ozone of UV are required. This greatly reduces cost, accelerates inactivation of microbiological organisms in the bulk of the aqueous system, and sustains elevated oxidation potential with substantially reduced free halogen concentrations. Trihalomethanes and chloramines are also reduced due to mineralization of organic demand.

Using the cyclic process of the invention, it is now cost effective to sustain chlorine dioxide concentrations as high as 1.0 ppm or even higher by regenerating chlorite anions that result from the reduction of chlorine dioxide. Furthermore, the efficacy of sustaining desired inactivation rates is achieved by sustaining elevated oxidation potentials with reduced levels of free halogen which as previously discussed, illustrates that the aqueous system is substantially free of oxidant demand. With demand all but eliminated from the aqueous system, chlorine dioxide functions primarily as a biocide, rather than as an oxidizer reduced by reacting with demand.

Another important health benefit from employing this invention is the reduced potential for accumulation of chlorite anions in the treated system. Chlorite is restricted to a level not to exceed 1.0 ppm in drinking water. Many states within the U.S. now require NSF 60 certification, a standard set by the National Sanitation Foundation for chemical treatments used in drinking water.

The ability of the cyclic process to regenerate chlorite anions to chlorine dioxide effectively reduces the residual concentration of chlorite in the treated system. By operating with limits on chlorine dioxide in the aqueous system, the feed rate of chemicals or compositions comprising the cyclic process can be optimized to prevent uncontrolled accumulation of chlorite anions. For example, as chlorite and bromide concentration increase, sulfate radicals regenerate bromide and some chlorite. Residual hypobromous acid continues to regenerate chlorite anions to chlorine dioxide. Chlorine dioxide concentrations rise and upon reaching or exceeding maximum level, the feed-rate of at least the chlorite donor is reduced. The residual chlorite in the aqueous system is regenerated until it is eventually depleted to levels whereby the chlorine dioxide concentration can no longer be sustained, and the chlorite donor feed is resumed. This simple process can eliminate excess chlorite concentrations and their potential health risk by controlling residual chlorite anion concentrations below 1.0 ppm.

Furthermore, the efficiency of employing the cyclic process allows potentially dangerous combination of chemistries to be avoided altogether. For example, combining oxidizers and halogen donors with sodium chlorite can begin forming chlorine dioxide by exposure to relative humidity. Coating can improve the stability. However, if water were to contact the compositions while stored in a feed system, a catastrophic event could still occur. By being able to store and feed the components utilized to produce the cyclic process separately, the process can be sustained safely without compromising the efficiency of chlorine dioxide generation. As illustrated in the examples, even dilute concentrations of chlorite are readily reacted with the other oxyhalogens and sulfate free radicals thereby resulting in the formation of chlorine dioxide. The need for producing chlorine dioxide in high concentrations of reactants is no longer necessary to achieve high conversion of chlorite to chlorine dioxide under near neutral conditions and in dilute solution.

Another benefit is the ability to safely generate high concentrations of chlorine dioxide using relatively dilute solutions of reactants by the in-situ generation of oxyhalogens. This ability provides the benefit of being able to "shock" an aquatic facility with chlorine dioxide and sulfate free radicals after the aquatic facility has been contaminated by a fecal release or other bio-contamination. A bromide donor and chlorite donor can be broadcast into the pool, which is either preceded or followed by addition of catalyst and sulfate free radical precursor. To further exemplify this process, a swimming pool contaminated by a fecal release can be treated with sodium chlorite and sodium bromide, followed by the addition of a composition comprising potassium monopersulfate and a catalyst comprising cobalt. The sulfate free radicals and to some extent the potassium monopersulfate react with bromide and chlorite ions to form oxyhalogens. As hypobromous acid is consumed to form chlorine dioxide, the resulting bromide anion is quickly regenerated to form more hypobromous acid which in turn can regenerate chlorite that resulted from the reduction of chlorine dioxide.

In this instance the cyclic process being supported by a period of excess sulfate free radical generation accelerates the decomposition of organic based demand in the water as well as accelerating the rate of inactivation of microbiological organisms.

It is claimed:

1. A cyclic process for the generation of oxyhalogens comprising at least chlorine dioxide for oxidation and the inactivation of microbiological organisms including *cryptosporidium parvum* in an aquatic facility, the process comprising:
   addition of a sulfate free radical precursor to the aquatic facility; and
   sustaining in said aquatic facility an effective amount of a catalyst that converts the sulfate free radical precursor to a sulfate free radical anion at a concentration no greater than 2.0 ppm, a halogen anion selected from at least one of a chloride or bromide, and a chlorite anion at a concentration from 0.1 to 100 ppm; whereby at least one of the sulfate free radical precursor and sulfate free radical reacts with the halogen anion to produce a free halogen donor, subsequent reaction of the free halogen donor with the chlorite anion to produce and sustain a chlorine dioxide concentration of about 0.1 to 20.0 ppm with a pH about 6.0 to 8.0; and
   wherein at least some portion of the recovered halogen anions and chlorite anions are recycled in the process.

2. The process of claim 1, wherein at least one of the sulfate free radical precursor and sulfate free radical reacts with the chlorite anion to produce chlorine dioxide.

3. The process of claim 1, wherein the sulfate free radical precursor comprises potassium monopersulfate, and the catalyst comprises at least one of cobalt and ruthenium.

4. The process of claim 1, wherein the sulfate free radical precursor comprises potassium persulfate, and the catalyst comprises at least one, of silver and copper.

5. The process of claim 1, wherein the sulfate free radical precursor comprises sodium persulfate, and the catalyst comprises at least one of silver and copper.

6. The process of claim 1 further comprising the addition of a free chlorine donor to the aquatic facility.

7. A cyclic process for the generation of oxyhalogens comprising at least chlorine dioxide for oxidation and the inactivation of microbiological organisms including *cryptosporidium parvum* in an aqueous system the process comprising:
   addition of a sulfate free radical precursor to the aqueous system; and
   sustaining in said aqueous system an effective amount of a catalyst that converts the sulfate free radical precursor to a sulfate free radical anion at a concentration no greater than 2.0 ppm, a halogen anion selected from at least one of a chloride or bromide, and a chlorite anion at a concentration from 0.1 to 100 ppm; whereby at least one of the sulfate free radical precursor and sulfate free radical reacts with the halogen anion to produce a free halogen donor, subsequent reaction of the free halogen donor with the chlorite anion to produce and sustain a chlorine dioxide concentration of about 0.1 to 20.0 ppm with a pH from about 6.0 to 8.0; and
   wherein at least some portion of the recovered halogen anions and chlorite anions are recycled in the process.

8. The process of claim 7, wherein at least one of the sulfate free radical precursor and sulfate free radical reacts with the chlorite anion to produce chlorine dioxide.

9. The process of claim 7, wherein the sulfate free radical precursor comprises potassium monopersulfate, and the catalyst comprises at least one of cobalt and ruthenium.

10. The process of claim 7, wherein the sulfate free radical precursor comprises potassium persulfate, and the catalyst comprises at least one of silver and copper.

11. The process of claim 7, wherein the sulfate free radical precursor comprises sodium persulfate.

12. A cyclic process for the generation of oxyhalogens comprising at least chlorine dioxide for oxidation and the inactivation of microbiological organisms including *cryptosporidium parvum* in an aqueous system the process comprising:
    addition of potassium monopersulfate to the aqueous system; and
    sustaining in said aquatic system an effective amount of a catalyst comprising at least one of cobalt and ruthenium, a chlorite anion at a concentration no greater than 2.0 ppm and bromide anion; whereby at least one of the potassium monopersulfate and sulfate free radicals reacts with the bromide anion resulting in the formation of hypobromous acid, subsequent reaction of the hypobromous acid with the chlorite anion to produce and sustain a chlorine dioxide concentration of about 0.1 to 20.0 ppm with a pH from about 6.0 to 8.0; and
    wherein at least some portion of the recovered bromide anions and chlorite anions are recycled in the process.

13. The process of claim 12 wherein the aqueous system is an aquatic facility.

14. The process of claim 12 wherein the aqueous system comprises vegetable washing.

15. The process of claim 12 wherein the aqueous system comprises laundry washing.

* * * * *